(12) United States Patent
Stewart, III et al.

(10) Patent No.: US 7,644,021 B2
(45) Date of Patent: Jan. 5, 2010

(54) ELECTRONICALLY ASSISTED ENTERPRISE JOURNAL SYSTEM

(75) Inventors: James R. Stewart, III, Florence, KY (US); Bruce E. Gregory, Nashville, TN (US)

(73) Assignee: The Kroger Co., Cincinnati, OH (US)

(*) Notice: Subject to any disclaimer, the term of this patent is extended or adjusted under 35 U.S.C. 154(b) by 729 days.

(21) Appl. No.: 11/055,549

(22) Filed: Feb. 10, 2005

(65) Prior Publication Data
US 2006/0190365 A1    Aug. 24, 2006

(51) Int. Cl.
    G06Q 40/00    (2006.01)
(52) U.S. Cl. .............................. 705/35; 705/40; 705/30
(58) Field of Classification Search .................. 705/35, 705/40, 30
    See application file for complete search history.

(56) References Cited

U.S. PATENT DOCUMENTS

| | | | | |
|---|---|---|---|---|
| 4,432,051 | A | * | 2/1984 | Bogaert et al. ............... 718/102 |
| 5,111,030 | A | * | 5/1992 | Brasington et al. .......... 235/380 |
| 5,442,780 | A | * | 8/1995 | Takanashi et al. ............... 707/1 |
| 5,665,953 | A | * | 9/1997 | Mazzamuto et al. ........ 235/375 |
| 5,682,477 | A | * | 10/1997 | Wakamiya et al. ............ 705/30 |
| 6,058,375 | A | | 5/2000 | Park |
| 2001/0029475 | A1 | | 10/2001 | Boicourt et al. |
| 2002/0032625 | A1 | | 3/2002 | Brown |
| 2002/0152142 | A1 | | 10/2002 | Schellmann et al. |
| 2003/0050876 | A1 | | 3/2003 | Tawara et al. |
| 2003/0097317 | A1 | | 5/2003 | Burk et al. |
| 2003/0158798 | A1 | | 8/2003 | Green |
| 2005/0278232 | A1 | * | 12/2005 | Bruffey et al. ................. 705/30 |

OTHER PUBLICATIONS

Pevarnik et al. "IRS finalizes regs. on FICA taxation of nonqualified deferred compensation.(IRS regulations)" Mar. 2000, Tac Adviser 31.3.147.*

Trietsch, Dan "Process setup adjustment with quadratic loss" Apr. 2000, IIE Transactions , 32 , 4 , 299.*

Procops, Tony "Linux, layering and listening: what to look for in a call-recording system.(Customer Relationship Management)" Jul. 2004, Customer Interaction Solutions , 23 , 1 , 32(3).*

* cited by examiner

Primary Examiner—Kelly Campen
(74) Attorney, Agent, or Firm—Thompson Hine LLP

(57) ABSTRACT

A method for processing accounting data of an enterprise includes entering accounting data entries associated with one or more accounts in memory of an interactive system, the interactive system capable of communicating with a batch system. At least some of the accounting data entries are copied to the batch system. The batch system includes a processor configured for rejecting certain ones of the accounting data entries copied to the batch system based on predetermined rules stored in memory of the batch system and associating reject information with rejected accounting data entries for use in correcting the rejected accounting data entries. The rejected accounting data entries are copied including the associated reject information to the interactive system.

16 Claims, 27 Drawing Sheets

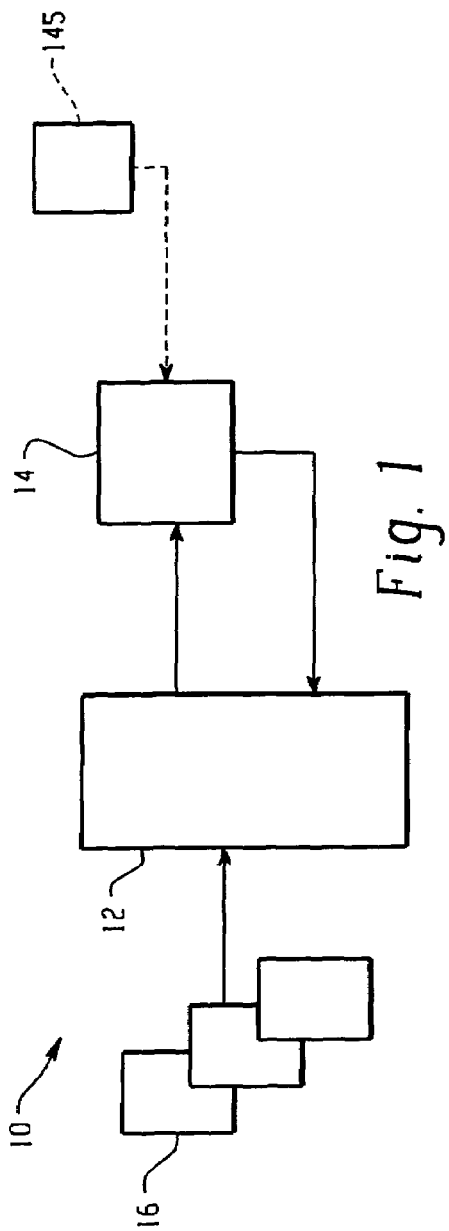
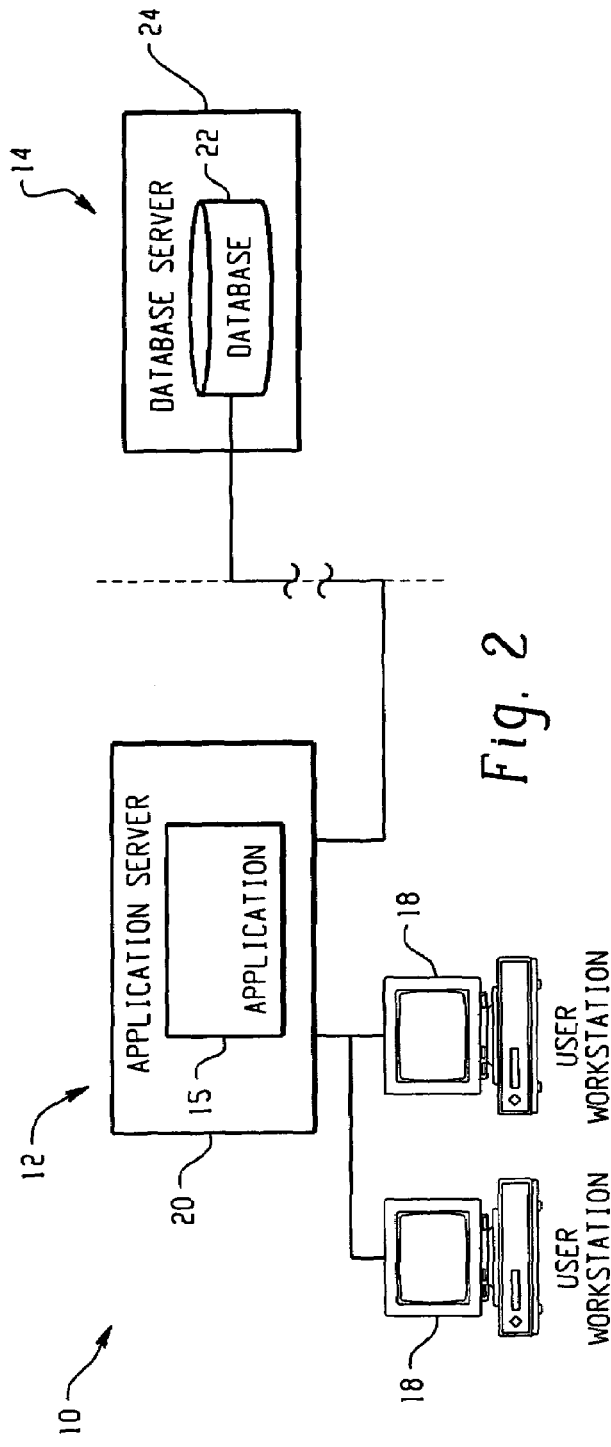

MATCH TO FIG.12B

| | A | B | C | D | E | F | G |
|---|---|---|---|---|---|---|---|
| 1 | Required | Required | Required | Required | Required | | |
| 2 | Division | Year | Period | Week | Description | | |
| 3 | 11 | 2004 | 12 | 48 | Charge floor care | | |
| 4 | | | | | | | |
| 5 | | | Total | 0 | | | |
| 6 | Required 5 Num | Required 5 Alp/Num | Required 6 Num | Required 2 Decimal | Required 40 Variable | 5 Alp/Num | 10 Variable |
| 7 | Location | Journal | Account | Amount | Description | Batch | Invoice |
| 8 | 2 | J/W5+ | 205400 | 22.31 | Move 10 week floor care | | |
| 9 | 979 | J/W51 | 205400 | 88.08 | Move 10 week floor care | | |
| 10 | 957 | J/W51 | 205400 | 222.53 | Move 10 week floor care | | |
| 11 | 657 | J/W51 | 205400 | 25.26 | Move 10 week floor care | | |
| 12 | 654 | J/W51 | 205400 | 54.81 | Move 10 week floor care | | |
| 13 | 652 | J/W51 | 205400 | 63 | Move 10 week floor care | | |

Fig. 12A

| H | I | J | K | L | M | N | O |
|---|---|---|---|---|---|---|---|
| 5 Alp/Num | 7 Variable | 10 Variable | 6 Alp Num | 6 Alp/Num | 8 Num | 14 Num | 105 Alp/Num |
| Study Code | Receiver | Vendor Name | Vendor Number | Maint Code | Unique Identifier | XREF Accoun | CA # |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

MATCH TO FIG. 12A

ELECTRONICALLY ASSISTED ENTERPRISE JOURNAL SYSTEM

TECHNICAL FIELD

The present application relates to methods, systems and software for use in entering and processing accounting records.

BACKGROUND

Business enterprises frequently employ various accounting applications for use in recording, maintaining and managing financial information. One example of a commercially available accounting application is Quicken® available from Intuit, Inc. of Mountain View, Calif. Such applications are typically confined to a local computer system or workstation. For geographically diverse business enterprises, communication between various, geographically separated computer systems (e.g., store-to-store, division-to-division, etc.) may be necessary in order to produce reliable accounting records. Support for such systems and applications can prove time consuming and expensive.

SUMMARY

In an aspect, a method for processing accounting data of an enterprise is provided. The method includes entering accounting data entries associated with one or more accounts in memory of an interactive system, the interactive system capable of communicating with a batch system. At least some of the accounting data entries are copied to the batch system. The batch system includes a processor configured for rejecting certain ones of the accounting data entries copied to the batch system based on predetermined rules stored in memory of the batch system and associating reject information with rejected accounting data entries for use in correcting the rejected accounting data entries. The rejected accounting data entries are copied including the associated reject information to the interactive system.

In another aspect, a method for processing accounting data of an enterprise is provided. The method includes entering accounting data entries associated with one or more accounts in memory of an interactive system, the interactive system capable of communicating with a batch system. The accounting data entries are copied to the batch system. The batch system includes a processor configured for batch processing of accounting data entries copied to the batch system. The accounting data entries processed by the batch system are copied to the interactive system and the accounts are reconciled using accounting data entries processed by the batch system and copied to the interactive system.

In another aspect, a system for processing accounting data of an enterprise includes an interactive system configured to receive and validate accounting entries based on predetermined rules stored in memory of the interactive system. A batch system is configured to receive accounting entries from the interactive system and to reject certain ones of the accounting entries received by the batch system from the interactive system based on predetermined rules stored in memory of the batch system. The interactive system is configured to receive entries rejected by the batch system.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is a diagrammatic illustration of an embodiment of an enterprise journal system;

FIG. 2 is an exemplary database model for the system of FIG. 2;

FIG. 4B is an exemplary detail table of the journal entry form of FIG. 4;

FIG. 6 is an embodiment of an electronic journal entry form;

FIG. 12 illustrates an embodiment of a properly formatted file for import into an electronic journal entry form;

FIG. 18 is an exemplary journal entry maintenance toolbar;

FIG. 20A is an example of a code for use in tracking a journal entry;

FIG. 21 is an embodiment of a reconciliation form;

FIG. 23 is an embodiment of an unsigned balance sheet report;

FIG. 25 shows the balance sheet of FIG. 24 including an electronic signature;

DETAILED DESCRIPTION

Figure 3:
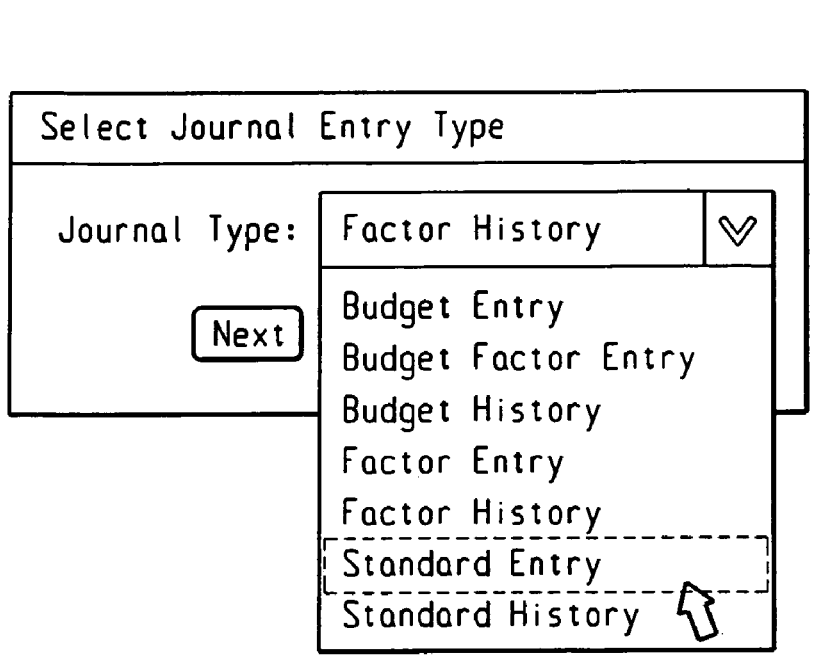
FIG. 3 is an exemplary drop-down list for selecting a journal entry form.

Referring to FIG. 1, a system 10 for use in entering and processing accounting records 16 includes an interactive system 12 and a batch system 14. By "interactive" system, we refer to a system whose input and output are interleaved as opposed to a "batch" system, in which the system's input is prepared before processing the input as a series of noninteractive commands, for example, that are executed in the order submitted. As will be described in greater detail below, the interactive system 12 interacts with a user to prepare accounting data for processing by the batch system 14. The processed accounting data is then made available to the user through the interactive system 12 for, e.g., account reconciliation, balance sheet reporting and/or reject management of accounting data entries.

Referring now to FIG. 2, the system 10 is illustrated as being implemented using a graphical user interface (GUI) that is accessible at a user workstation 18 (e.g., a Think Centre™, commercially available from International Business Machine Corp. (IBM), Armonk, N.Y.), an application server 20 (e.g., IBM's WebSphere Application Server, v. 2.0 for AIX), a database 22 (e.g., a DB2 Universal Database V8.1) and associated database server 24 (e.g., an IBM eserver p690). While only one application server 20 is illustrated, the system 10 can include multiple workstations and application servers containing one or more applications that can be located at geographically diverse locations. In some embodiments, the interactive system 12 is implemented using a wide area network (WAN), such as an intranet or the Internet. The workstation 18 may include digital systems and other devices permitting connection to and navigation of the network. Other system 10 variations allowing for communication between various geographically diverse components are possible. The lines depicted in FIG. 2 indicate communication rather than physical connections between the various components.

The interactive system 12 includes an accounting application 15 (in some embodiments, developed as a J2EE application) that provides functionality for use in capturing, processing and maintaining valid accounting data by allowing the creation, review, approval and transmission of journal entries from the interactive system 12 to the batch system 14 for batch processing. The interactive system 12 may also allow management or control of applications using, e.g., an authentication application such as SiteMinder™ by Netegrity, Inc. of Waltham, Mass. to provide system security and/or to assign user permissions.

I. Creating/Modifying Entries Using the Interactive System

Referring to FIG. 3, the accounting application 15 allows for selection, creation and/or modification of several types of journal entries including "standard" entries, "standard history update" entries, "factor" entries, "factor history update" entries, "budget" entries, "budget history update" entries and "budget factor" entries. The term "entry" refers to a batch of one or more records. A standard entry is a journal entry which adds or subtracts dollars from a general ledger account or accounts. A factor entry is a journal entry which adds or subtracts a number from a general ledger factor. A factor is an account-like number, which can store a figure for tracking purposes, such as dollars, gallons, units, pounds, as examples. A budget entry is a journal entry which adds or subtracts dollars from a budget account. Budget entry accounts can be used as goals and can be compared to standard accounts to determine actual budget versus goal budget. A budget factor entry is a journal entry which adds or subtracts a number from a general ledger budget factor. A budget factor can be used for tracking goals and can be compared to standard factors to determine actual budget versus goal budget. A history update is a journal entry provides information for a period already closed directed to any of the journal entry, factor entry or budget entry. Access to forms associated with the entries can be provided using, e.g., a drop-down list 35, such as that shown by FIG. 3.

Figure 4A:
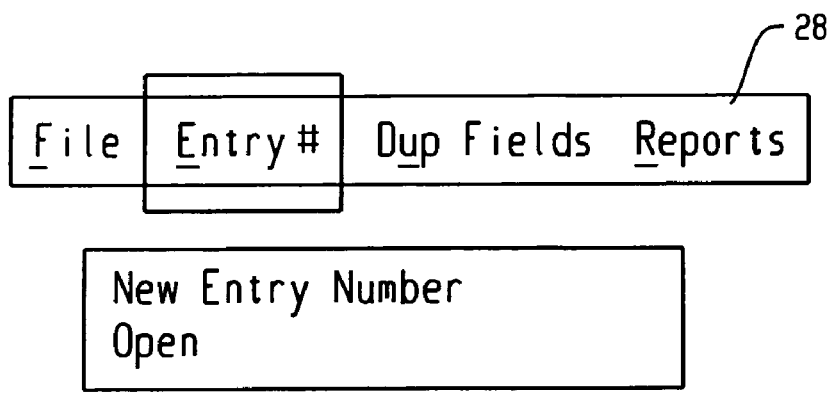
FIG. 4A illustrates an exemplary menu bar of the journal entry form of FIG. 4.
Figure 4:
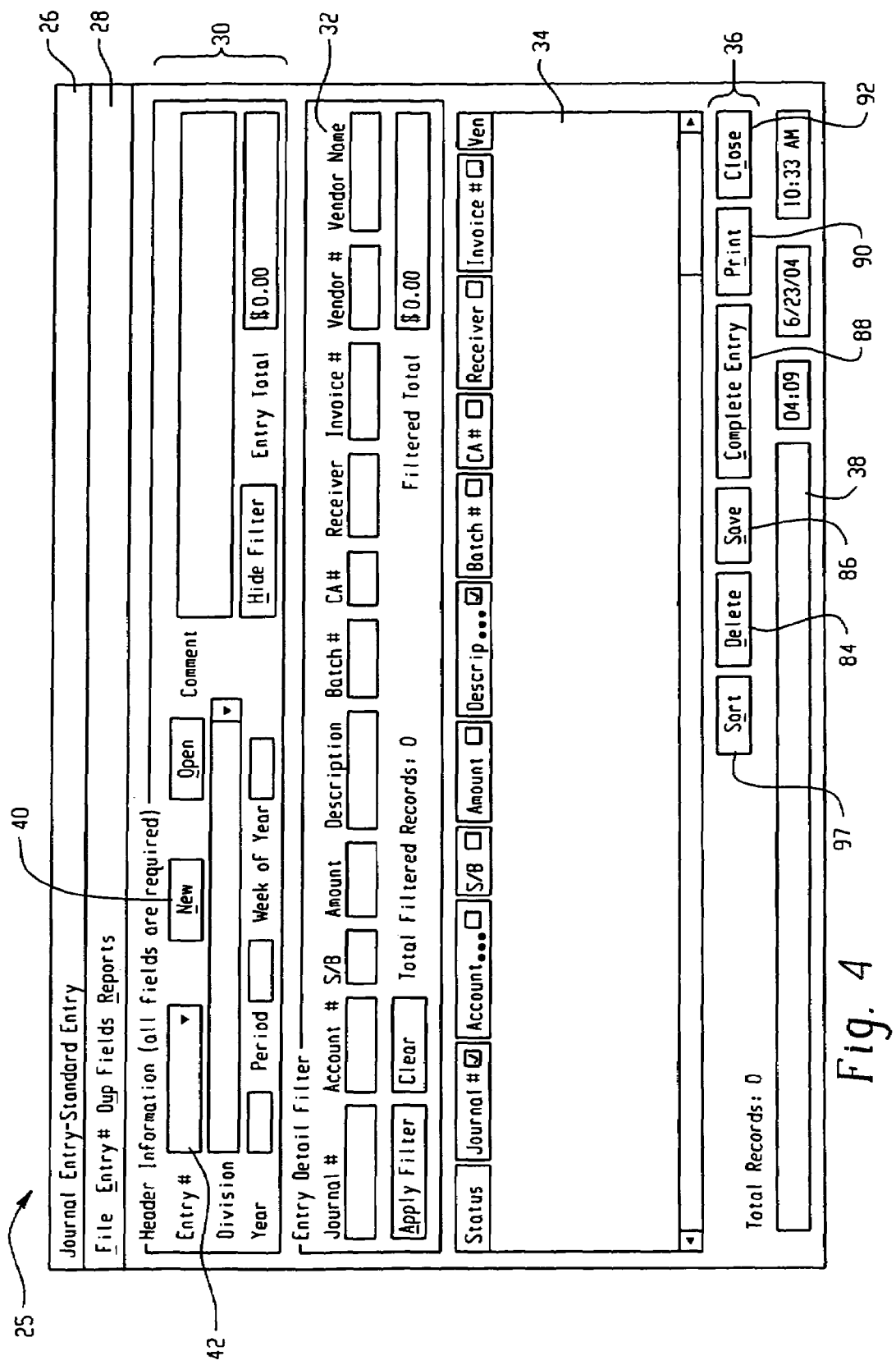
FIG. 4 is an embodiment of an electronic journal entry form.
Figure 5:
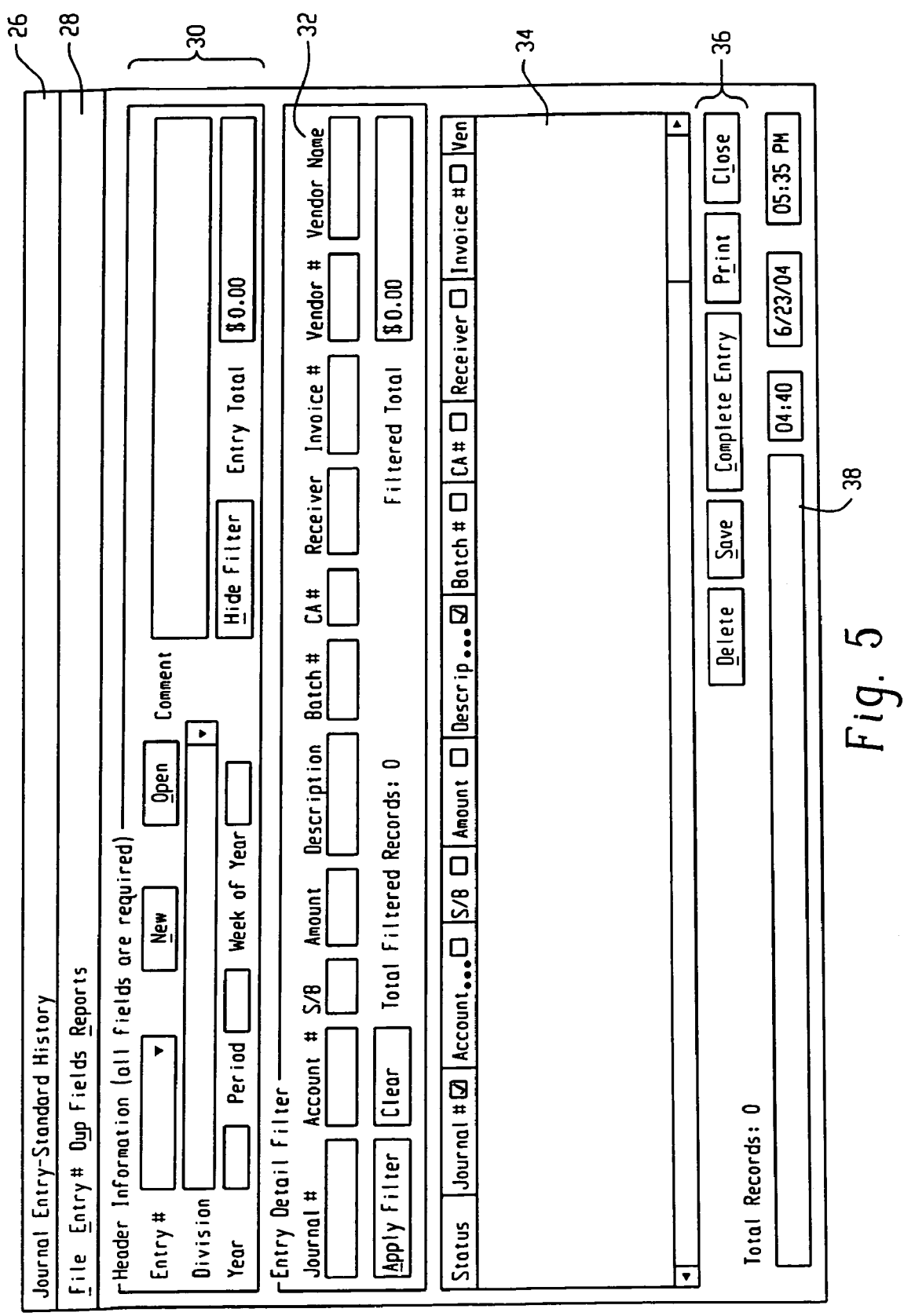
FIG. 5 is an embodiment of another electronic journal entry form.
Figure 6:
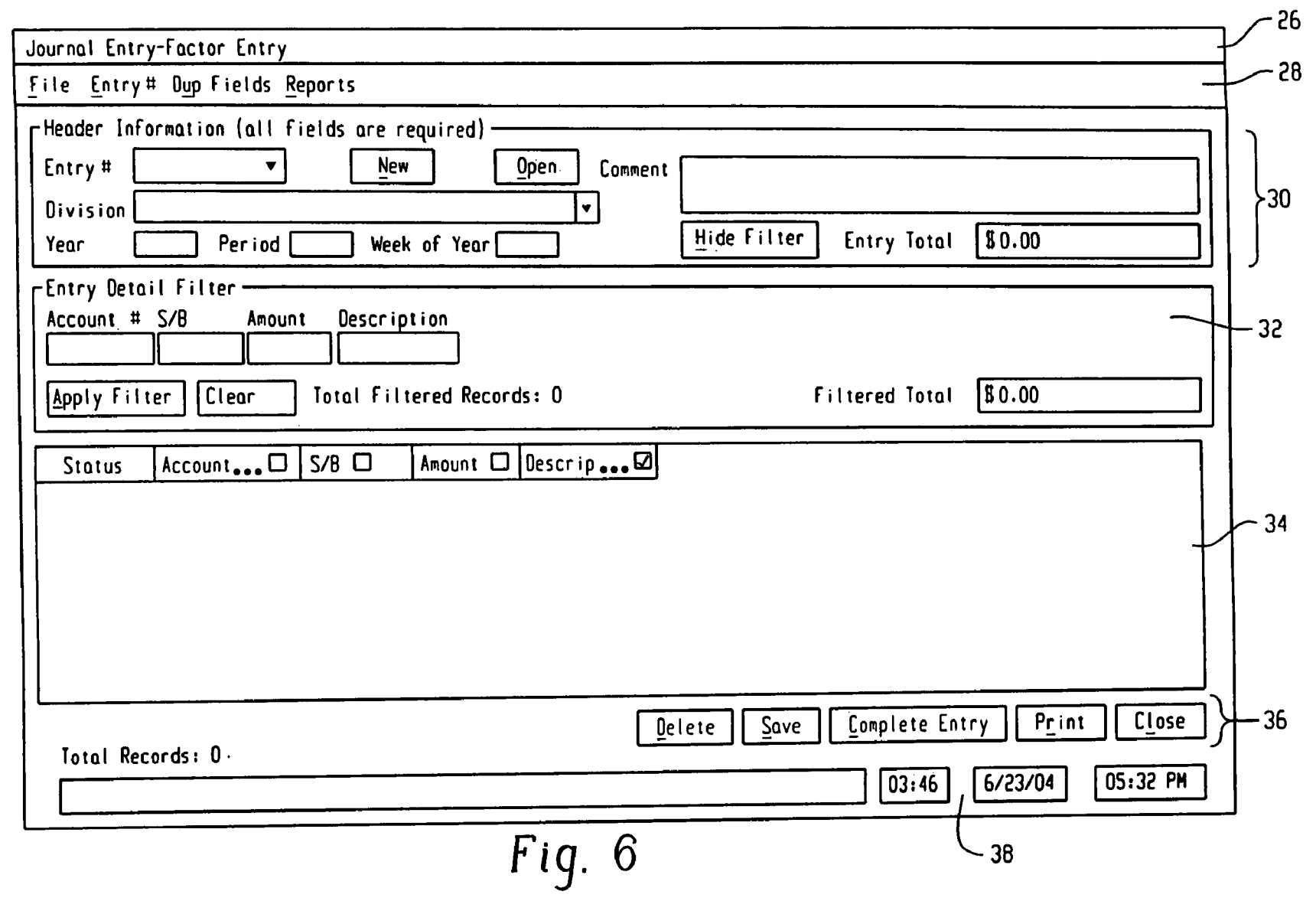
Figure 7:
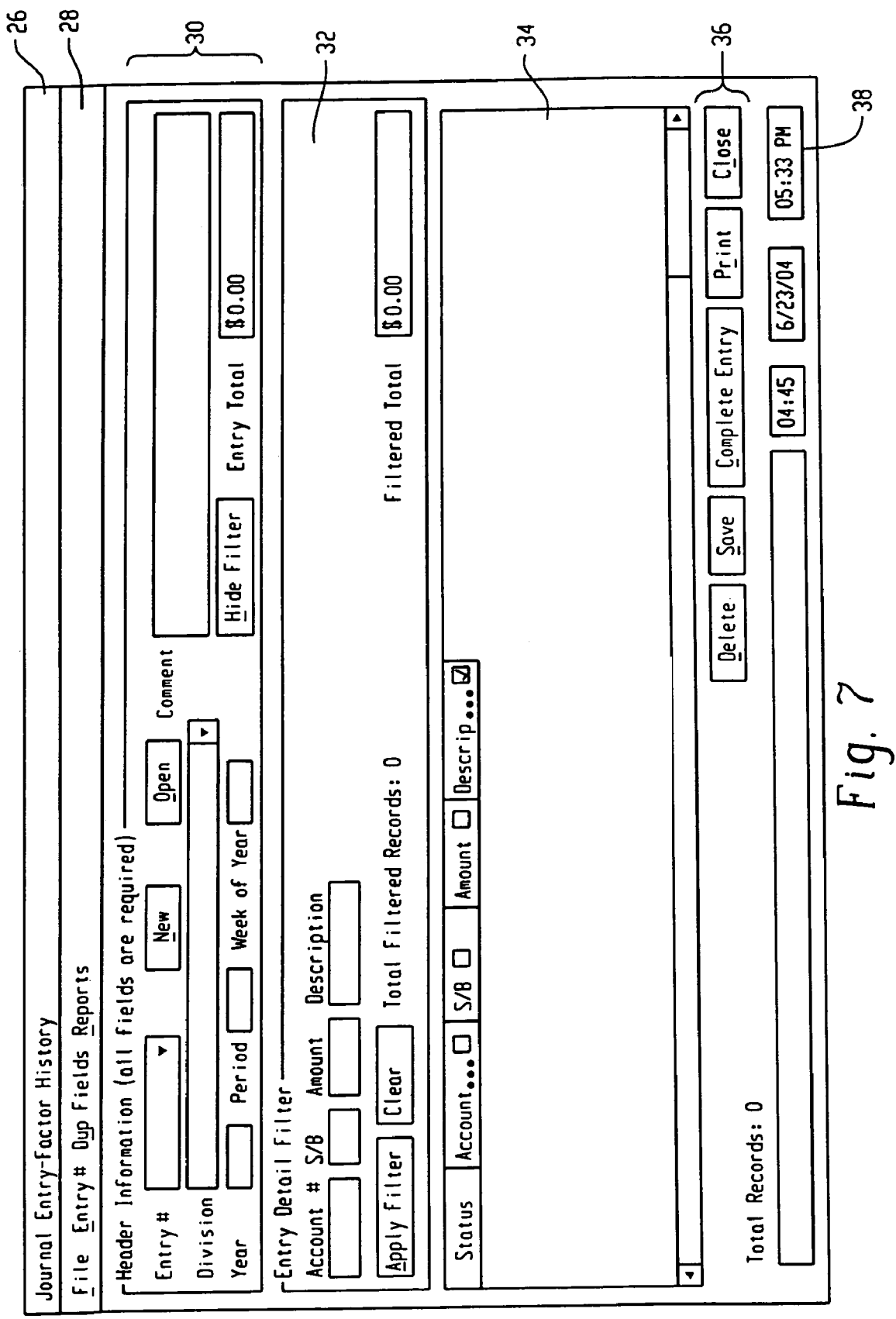
FIG. 7 is an embodiment of another electronic journal entry form.
Figure 8:
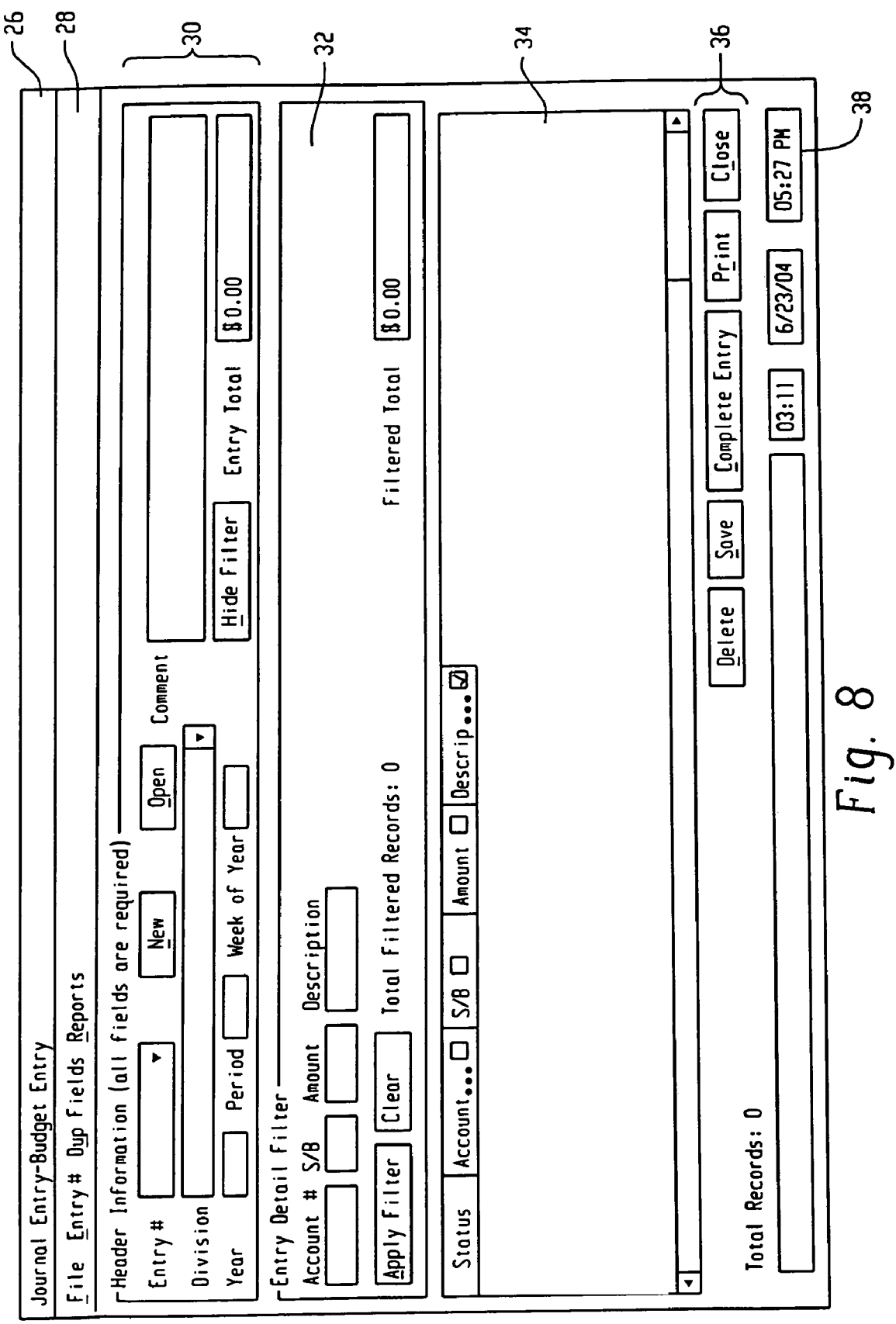
FIG. 8 is an embodiment of another electronic journal entry form.
Figure 9:
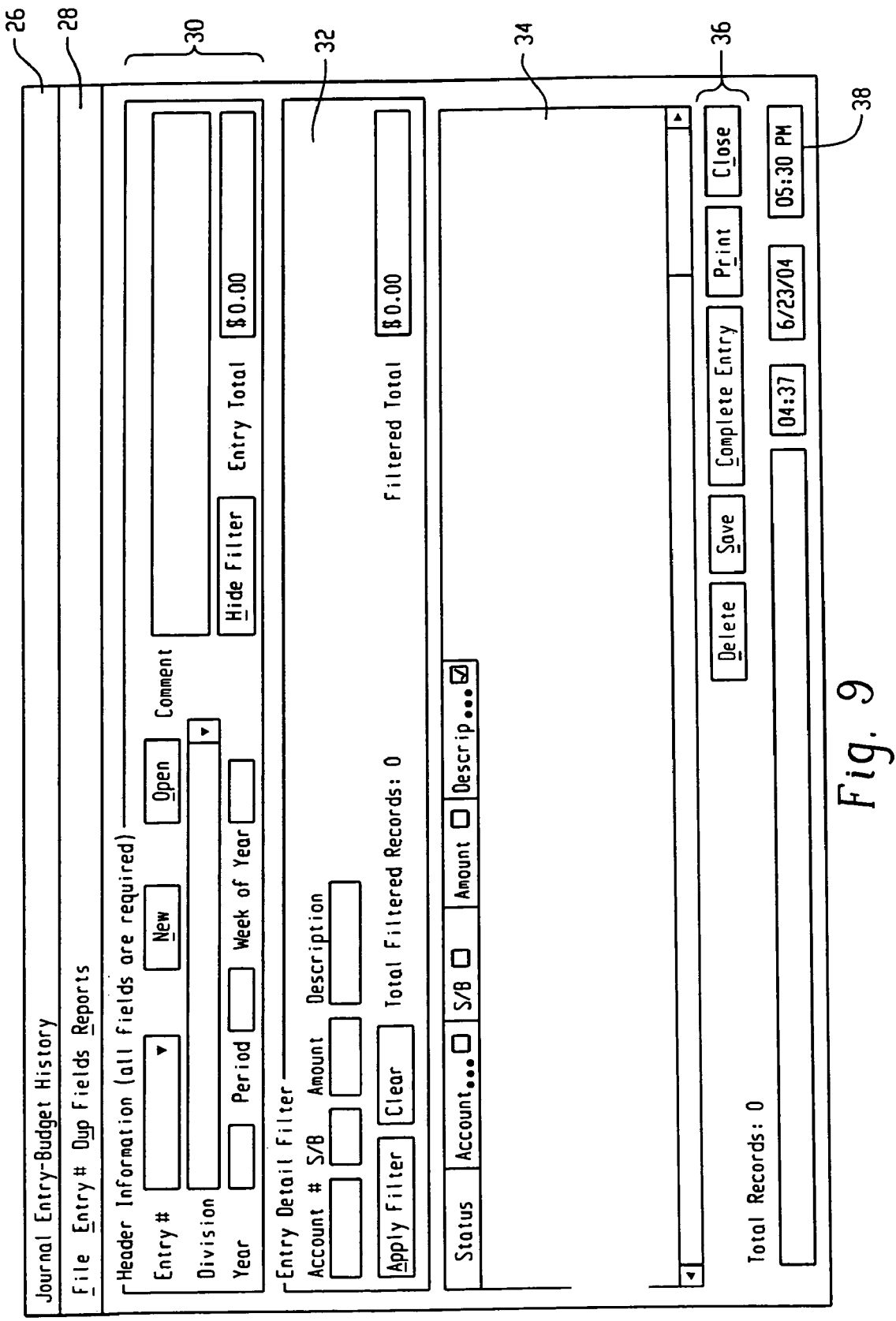
FIG. 9 is an embodiment of another electronic journal entry form.
Figure 10:
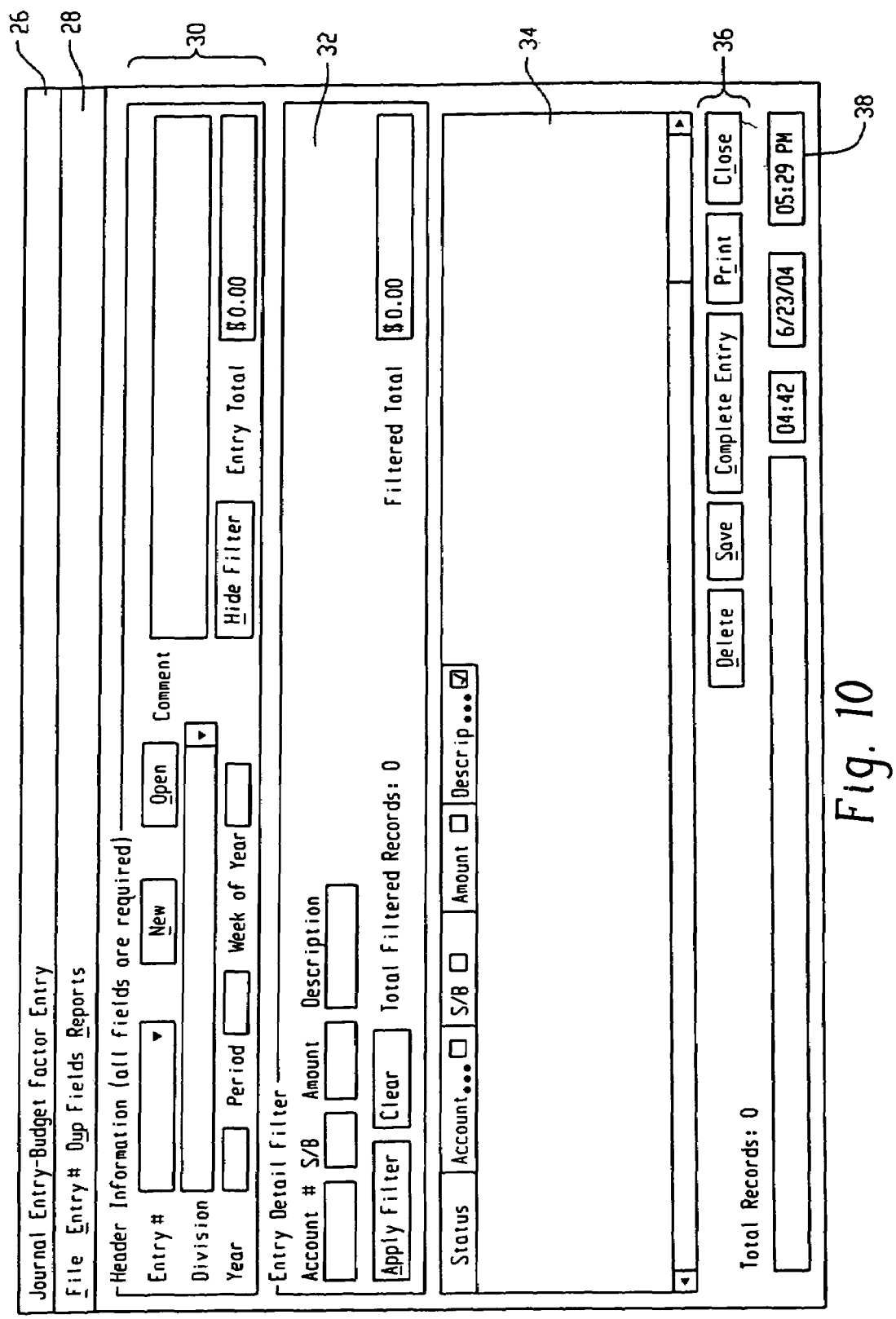
FIG. 10 is an embodiment of another electronic journal entry form.

FIG. 4 shows an example of an electronic standard entry form 25. The standard entry form 25 includes a title bar 26 that indicates the type of journal entry viewed, a menu bar 28 displayed below the title bar, a header information section 30, an entry detail filter 32 enabling filtering of entries, an entry detail table 34 where entry data is entered and validated, an action button section 36 where the user can perform a variety of functions, e.g., delete and save entry data from the entry form screen, and a status bar 38 displayed at the bottom of the form 25 that displays information such as entry error information, entry create time, entry create date, etc. The standard entry form includes all of the fields and functions used on all the forms of the other entry types (i.e., the standard history update entry form (FIG. 5), factor entry form (FIG. 6), factor history update entry form (FIG. 7), budget entry form (FIG. 8), budget history update entry form (FIG. 9) and budget factor entry form (FIG. 10)), although, as can be seen, the forms of the other entry types may not include all the fields and functions of the standard entry form.

Figure 4B:
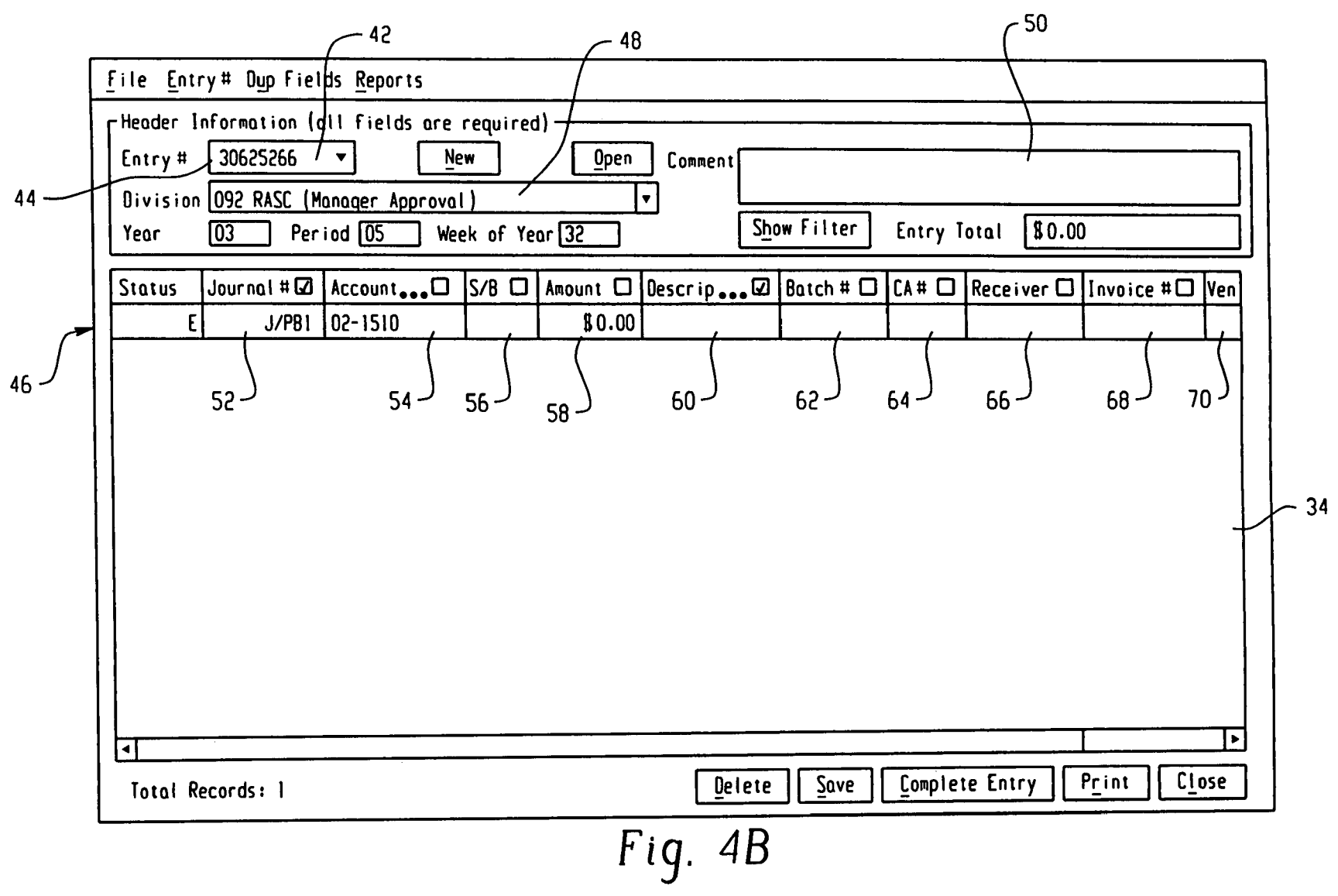

To create an entry, the user may select either "New Entry Number" from the menu bar 28 (see FIG. 4A), or actuate a "New" button 40 located in the header information section 30 which causes the interactive system 12 to populate an entry number field 42 with an auto generated entry number 44 and to create an entry detail record 46 located in the entry detail table 34 (see FIG. 4B). Other variations are possible, such as entering a keystroke command to create a new entry. The entry number 44 is a unique identification number of the application composed of predetermined values, such as values identifying the current fiscal year, current fiscal period and/or a system-generated, automatically incremented numeric value. Alternatively, the entry number 44 may be a random number. A store division and/or comments can also be associated with the entry by populating a division field 48 and comments field 50 located in the entry detail table 34. Referring to FIG. 4B, journal entry details, such as journal number, account number, store or buyer number (S/B), amount, description, batch number, receiver number, invoice number, vendor number, capital appropriation (CA), etc. can be added to respective fields 52, 54, 56, 58, 60, 62, 64, 66, 68 and 70 of the entry detail record 46 located in the entry detail table 34.

Figures 11, 13:
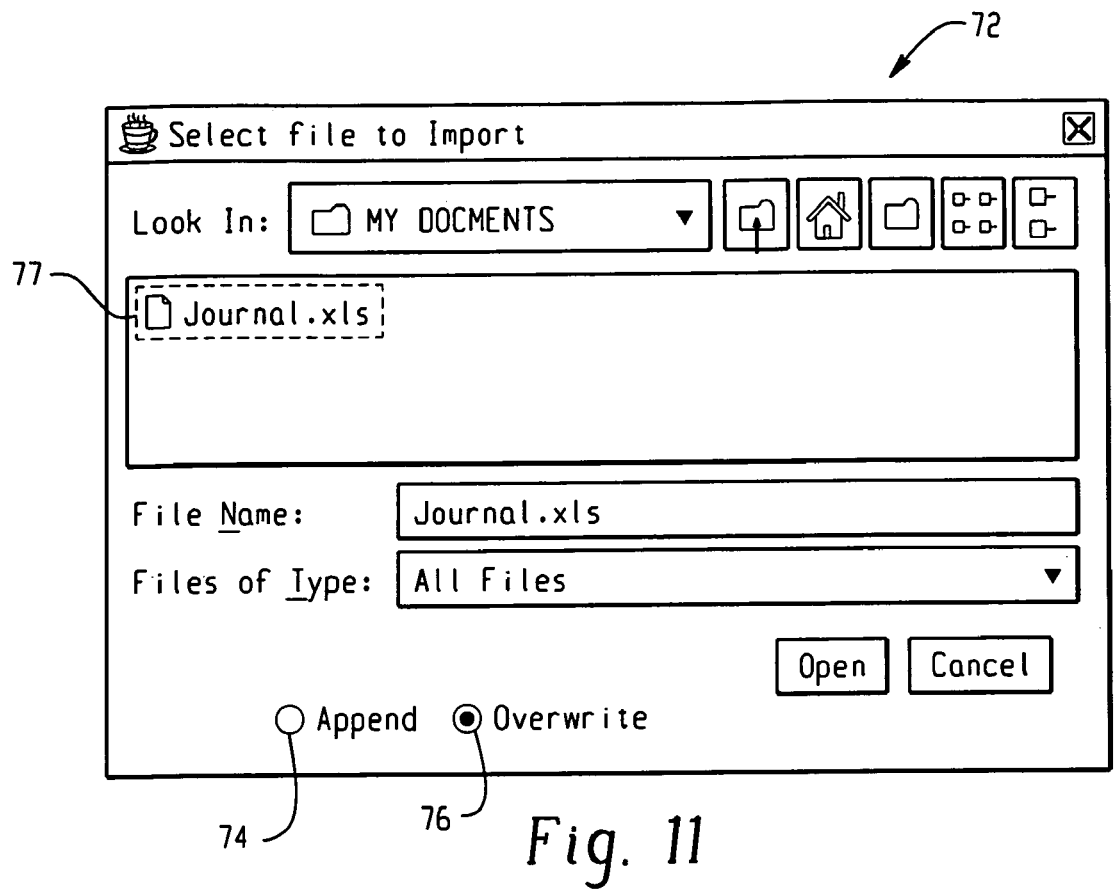
FIG. 11 is an exemplary dialogue box.
FIG. 13 is a detail view of an embodiment of an electronic journal entry form displaying an error message.

As an alternative to manually populating the entry record detail fields in the entry detail table 34, the interactive system 12 allows for importation of entry record details from another application that is of an acceptable file format, e.g., a text file (.txt), an Excel™ file (.xls), etc. Referring to FIG. 11, the application provides an import dialogue screen 72 that can list files 77 from memory (e.g., of a local database) for user selection. Dialogue screen 72 includes append and overwrite options 74 and 76. By selecting the append button 74, imported details will be added to pre-existing detail rows in the entry detail table 34. Conversely, by selecting the overwrite button 76, imported details will replace the pre-existing detail rows in the entry detail table. For example, FIG. 12 shows an example of a correctly formatted Excel™ file 79 for importation into the entry detail table 34. By selecting the append button 74, rows 81 of the file 79 will be added to pre-existing detail row in the entry detail table 34. By selecting the overwrite button 76, rows 81 will replace pre-existing detail rows in the entry detail table 34. This ability to import files can be useful in instances, for example, where a user is more comfortable creating tables in a different application or has already created tables in a different application.

Figure 29:
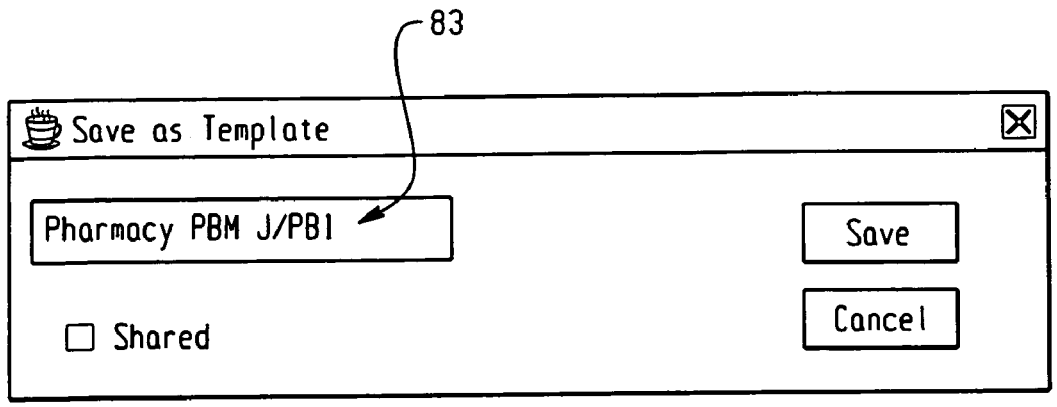
FIG. 29 shows an embodiment of a save template screen.
Figure 30:
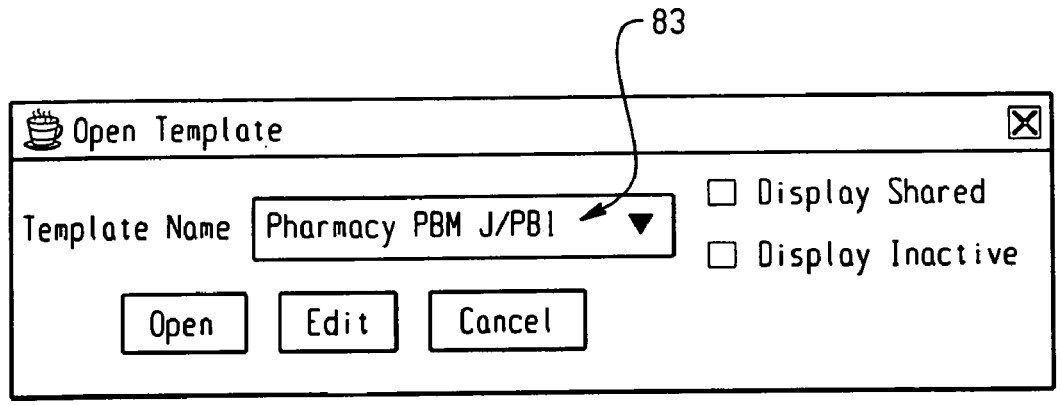
FIG. 30 shows an embodiment of an open template screen.
Figure 31:
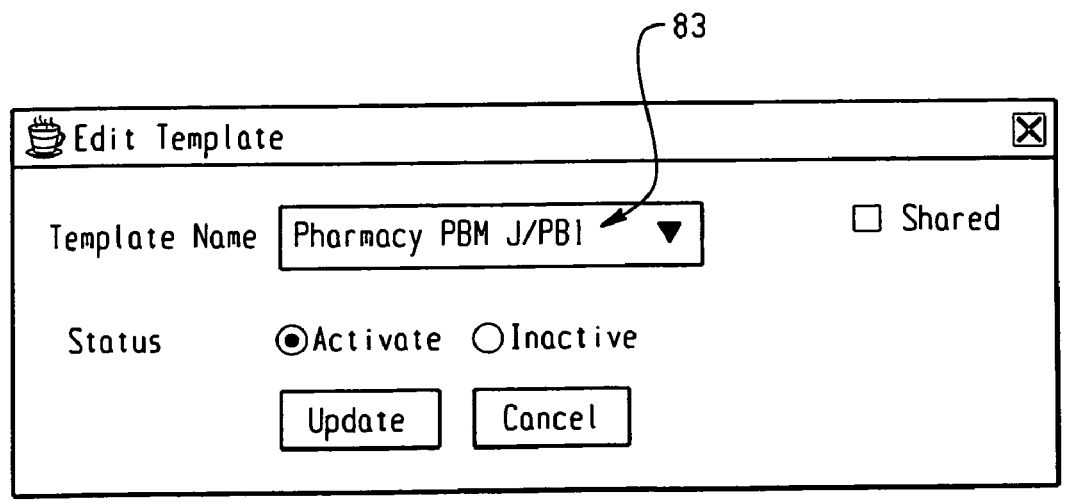
FIG. 31 shows an embodiment of an edit template screen.

The interactive system 12 can also provide template functionality for use in creating and/or modifying journal entries. The template functionality allows a user to create and modify a journal entry template 83 that can, in turn, be used to repeatedly create new entries (FIGS. 29-31). Templates can be created from a new entry or by modifying an existing entry and, when opened, populate certain ones of the fields in the respective entry form (see FIGS. 4-10), e.g., to reduce the amount of data that must be repeatedly entered manually. This can reduce entry time and reduce entry errors associated with repetitive, manual data entry. Once created, a permission can be associated with the template allowing only individual use or shared use by multiple users that have the appropriate permission.

Figure 14:
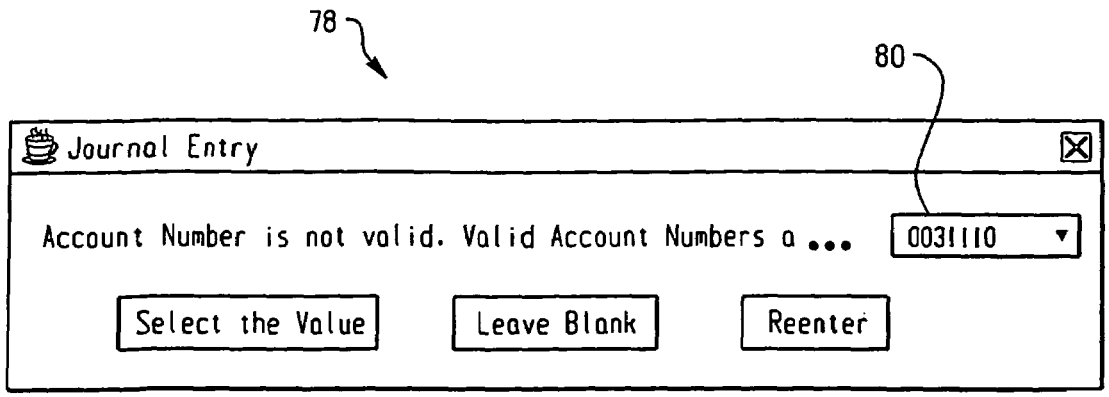
FIG. 14 is an exemplary error message including a list.
Figure 15:
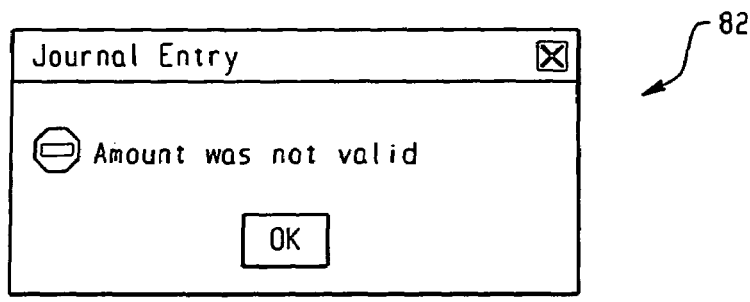
FIG. 15 is an exemplary error message.

Referring back to FIGS. 4-10, as the fields of the entry detail table 34 are populated, the interactive system 12 validates the data entered using predetermined rules stored in memory of the interactive system 12. These rules can be accounting related, such as requiring balanced entries (zero balance) and/or detail related, such as requiring a division number having a certain amount of digits or requiring entry of an existing store valid for an account (e.g., an existing store number in a chart of accounts stored in the memory of interactive system 12), etc., as examples. Referring to FIG. 13, if an error is detected, an indicator 81 is displayed in the Status column of the errant detail record. In the illustrated embodiment, a visually distinct red "E" can be displayed to indicate an error, however, any other suitable indicator can be displayed. The interactive system can also display the cause of the error to the user in the status bar 38. In FIG. 13, as an example, the interactive system 12 indicates in the status bar 38 that the journal number entered in the entry data table 34 is not valid for the selected division. This can allow the user to re-select and/or re-enter the entered accounting data populating the associated fields. As will be described in greater detail below, the predetermined rules of the interactive system 12 correspond to an acceptable batch-processing format of and information stored in the batch system 14. Interactive system 12 allows the user to correct entry errors detected by the interactive system based on the predetermined rules, which can reduce batch system rejects generated during batch processing of the accounting entries. In some embodiments to aid the user in correcting entry errors, referring to FIG. 14, the interactive system 12 displays a selection screen 78 that allows for the selection from a list 80 of valid entries stored in the interactive system's memory. In some cases, referring to FIG. 15, a journal entry error message 82 is displayed in response to a detected error.

Figure 16:
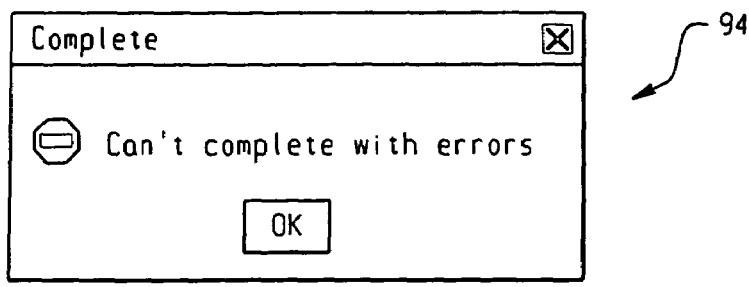
FIG. 16 is another exemplary error message.

Referring, for example, back to FIG. 4, buttons 84, 86, 88, 90, 92 and 97 in the action button section 36 allow the user to determine the number of records, delete an entry, save an entry (e.g., to complete later), complete an entry, print an entry, close an entry and sort entries, respectively. Completing an entry instructs the interactive system to validate (i.e., approve) selected entries, changing the status of the entry from open to approved, pending review or completed. The status may depend on the user's permissions. For example, if the user has neither an auto approve permission (i.e., a permission allowing automatic approval of that user's entries by the interactive system) nor a require approval permission (i.e., a permission requiring approval of that user's entries by a different user, such as a manager), the status of the entry may be changed from open to completed. If there are any errors in the entry data table 34 when attempting to complete or approve an entry, the interactive system 12 prevents completion or approval of the entry and displays an error screen 94 (FIG. 16) indicating that errors must be corrected before an entry can be completed or approved.

Figure 17:
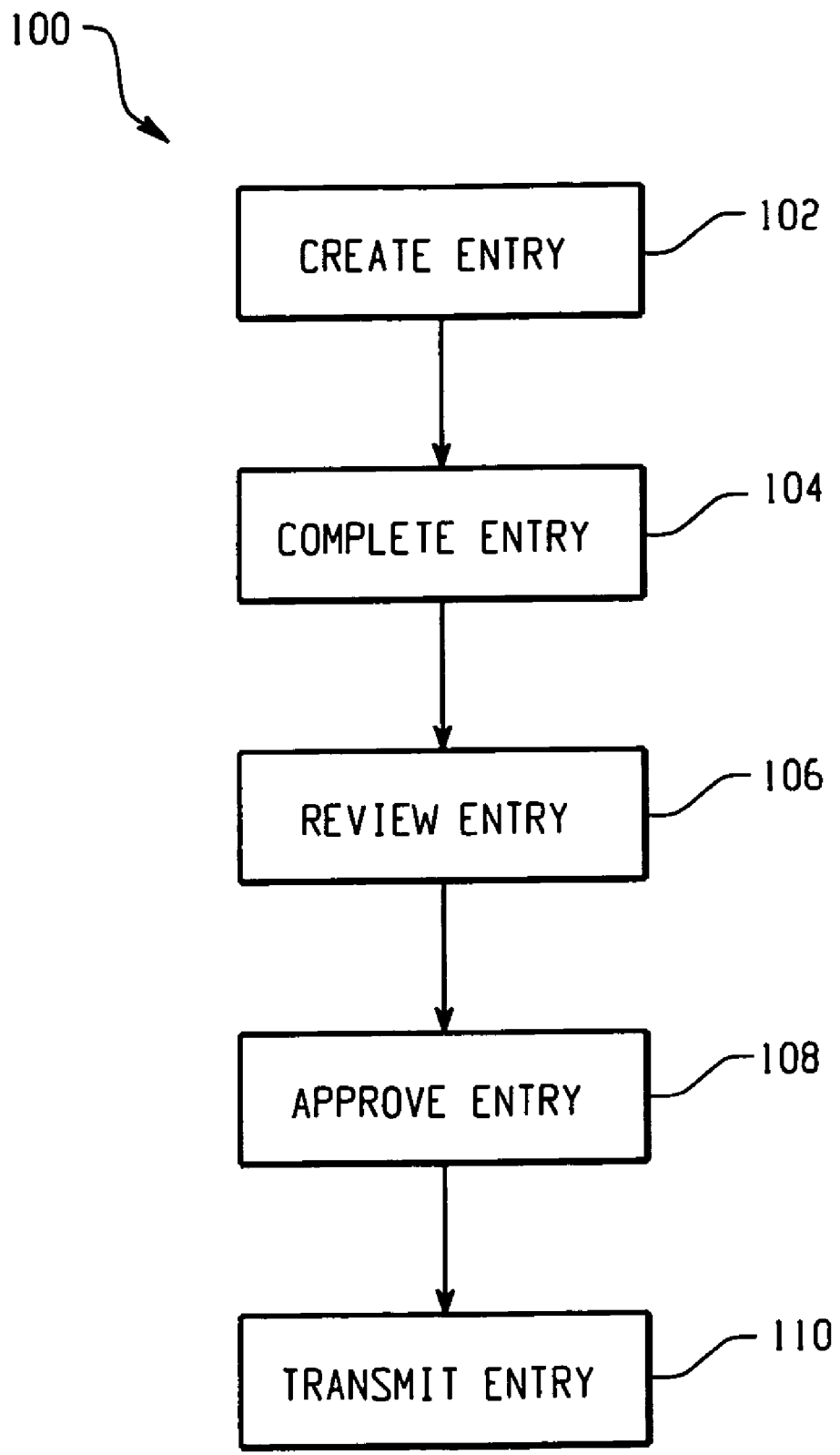
FIG. 17 is an embodiment of a process for use in the system of FIG. 1.

Referring to FIG. 17, a high-level flow diagram illustrates the basic workflow process 100 for the interactive system 12. The journal entry is created 102, completed 104, reviewed 106, approved 108 and then transmitted 110 (to the batch system 14). In some embodiments, the process 100 may review a completed entry to determine whether the entry requires review 106. If not, the entry may be allowed to bypass review 106 and proceed directly to approve 108. At each stage of the process, the interactive system 12 assigns (or maintains) an entry status for the particular entry. This entry status is sometimes referred to as the Life Cycle Code (LCC). Table I, below, sets forth some LCC examples, other examples are possible and the table should not be construed as limiting.

TABLE I

| Status Level | Code | Description |
| --- | --- | --- |
| In Process | I | When an entry is first created, its status is set to In Process, however, the interactive system immediately saves all new entries, putting them into an Open state |
| Open | O | An Open entry is any entry that has been saved, but not Completed. |
| Pending Review | P | An entry is set to Pending Review status when a user with a Require Review permission Completes the entry. The interactive system provides a Reviewer with the capability to Approve entries with the status of Pending Review. |
| Completed | C | An entry's status is set to Completed when a user without Auto Approve or Pending Review permissions Completes the entry. |
| Approved | A | Entries are set to the Approved status when (1) an entry is Completed by a user with the Auto Approve permission, or (2) an entry is approved by a Reviewer having an approver permission. |
| Transmitted | X | Entries that have been Transmitted to the batch system. |
| Rejected | R | Entries that have been transmitted for processing, but have been Rejected by the batch system. |
| Finished/Approved | F | Entries that have been successfully processed by the batch system. |
| Deleted | D | Entries that have been Deleted. |

Only users with an appropriate permission are able to view and/or modify the status of an entry and the interactive system 12 will process only those entries set to a particular status (e.g., as set forth above in Table 1).

II. Journal Entry Maintenance Using the Interactive System

Figures 18, 20A:
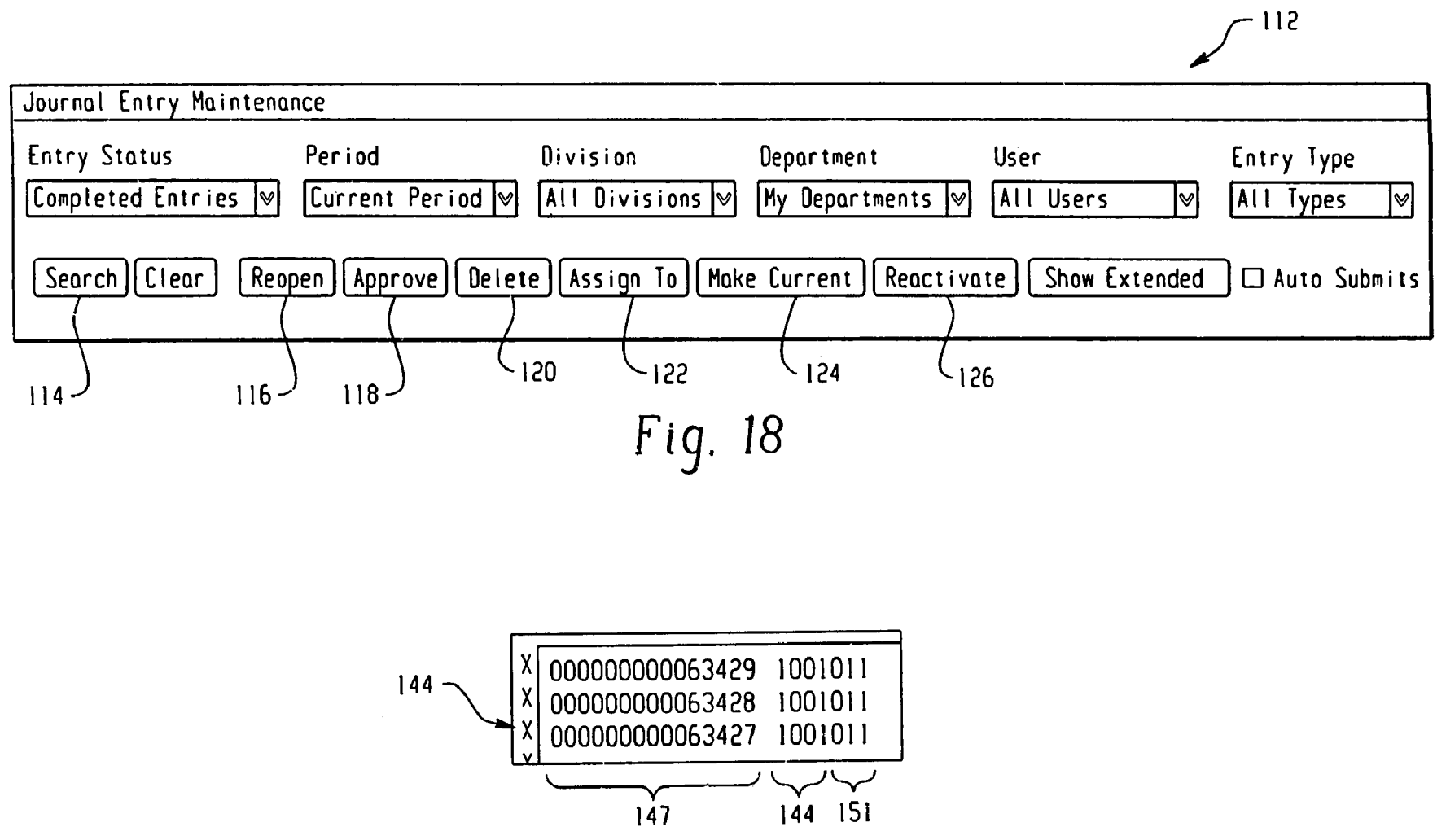

Referring to FIG. 18, the interactive system 12 includes a journal entry maintenance screen having a maintenance filter 112 and a results table (not shown) that allows a user to search and view entry details 114, reopen an entry 116, approve an entry 118, delete an entry 120, reassign an entry 122, make an entry current 124 and reactivate an entry 126. By reopening an entry, the interactive system 12 sets the LCC of that entry to Open. The interactive system 12 allows an entry to be reopened only when the current entry status is one of Completed, Deleted or Pending Review. By approving an entry, the interactive system 12 sets the LCC of the entry to Approved. Interactive system 12 allows an entry to be approved only when the current entry status is one of Completed or Pending Review. By deleting an entry, the interactive system 12 sets the LCC of the entry to Deleted. Interactive system 12 allows an entry to be deleted only when the current entry status is one of Completed, Pending Review or Approved. By reassigning an entry, the interactive system 12 allows a user to assign responsibility of entries to another user. By making an entry current, the interactive system 12 changes the year, period and week fields of the selected entries to the current year, period and week. Interactive system 12 allows an entry to be made current only when the current entry status is one of Open, Completed or Pending Review.

III. Routing Journal Entries for Batch Processing and Reject Management

Figure 19:
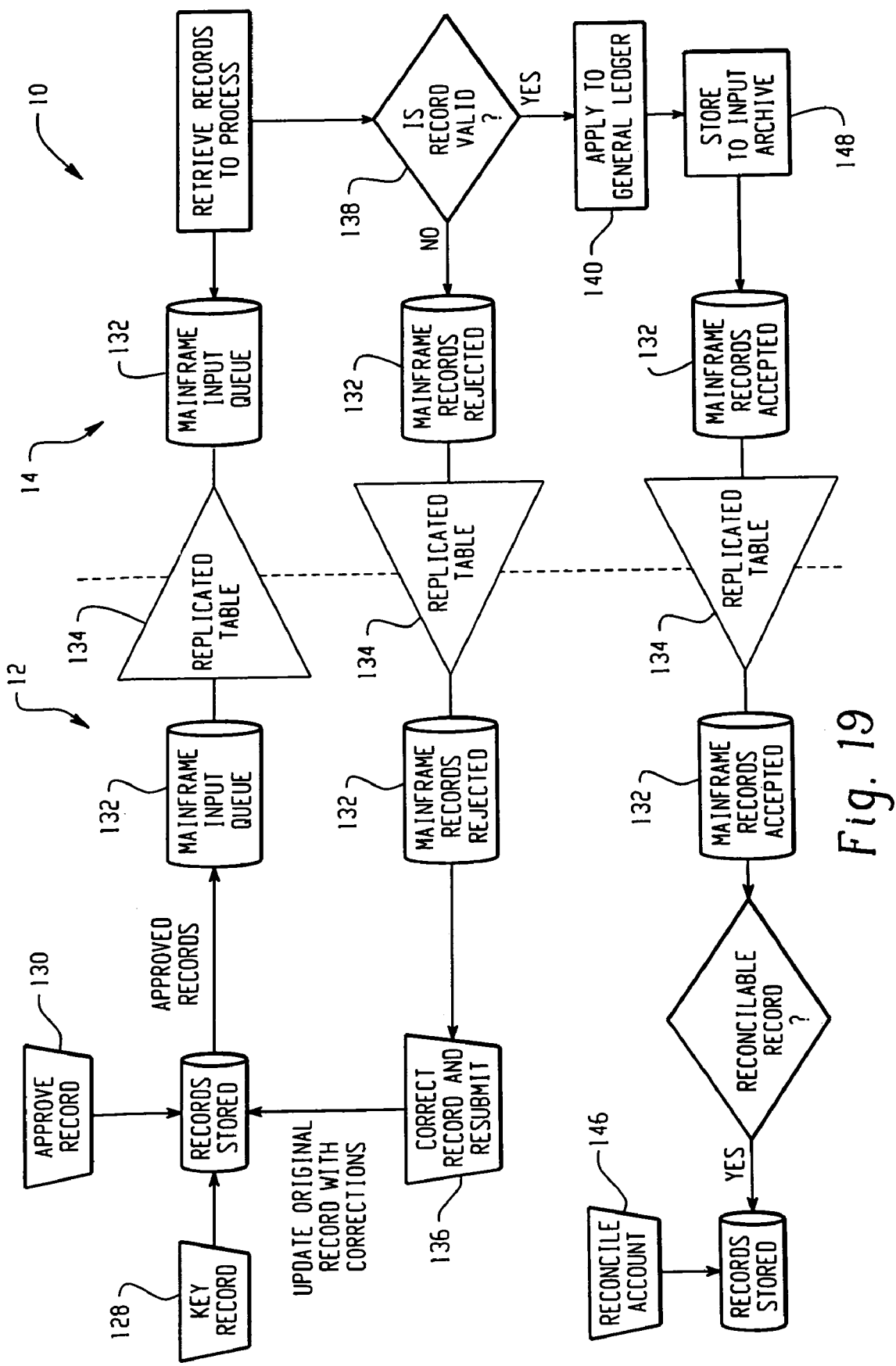
FIG. 19 is an embodiment of a process for use in the system of FIG. 1.

FIG. 19 illustrates a flow diagram for transmitting approved journal entries from the interactive system 12 to the batch system 14 and then back to the interactive system. As described above, the user enters journal entries at an entry step 128 into the interactive system 12. Entry is facilitated by the accounting application 15 (FIG. 2) and the entries are created, stored and/or, in some cases, modified based on the predetermined rules stored in memory of the interactive system 12. Entries that are approved 130 are queued in a batch queue 132. Periodically, the queued, approved entries are replicated 134 (e.g., by a data transfer device, such as a data propagator) in a format, such as a table, acceptable to the batch system 14 for batch processing. The frequency of replication of approved entries to the batch system 14 can be selected as desired, such as, for example, real-time, weekly, bi-weekly, monthly, bi-monthly.

The batch system 14 determines whether the journal entry is valid based on predetermined rules stored in memory of the batch system at a validation step 138. If one or more of the entries are invalid, the batch system 14 rejects the invalid entries for user correction. Valid entries are processed by the batch system 14 and applied to a general ledger 140.

Journal entries queued in the batch queue 132 are periodically (or based on some other event) retrieved for processing. In some cases, at least some of the journal entries retrieved (e.g., less than about five percent, such as about two percent) are rejected by the batch system 14, as noted above. The rejected journal entries are routed and queued at the batch queue 132 and then replicated to the interactive system 12 for user correction 136. This electronic replication of journal entry rejections from the batch system 14 to the interactive system 12 can eliminate need for, e.g., paper printing of error reports. In some embodiments, the batch system 14 associates an error indicator, such as a numeric error code, with the rejected journal entry. This code can allow the user or the interactive system 12 to identify the nature of the error, e.g., using a look-up table with associated error messages.

Figure 20:
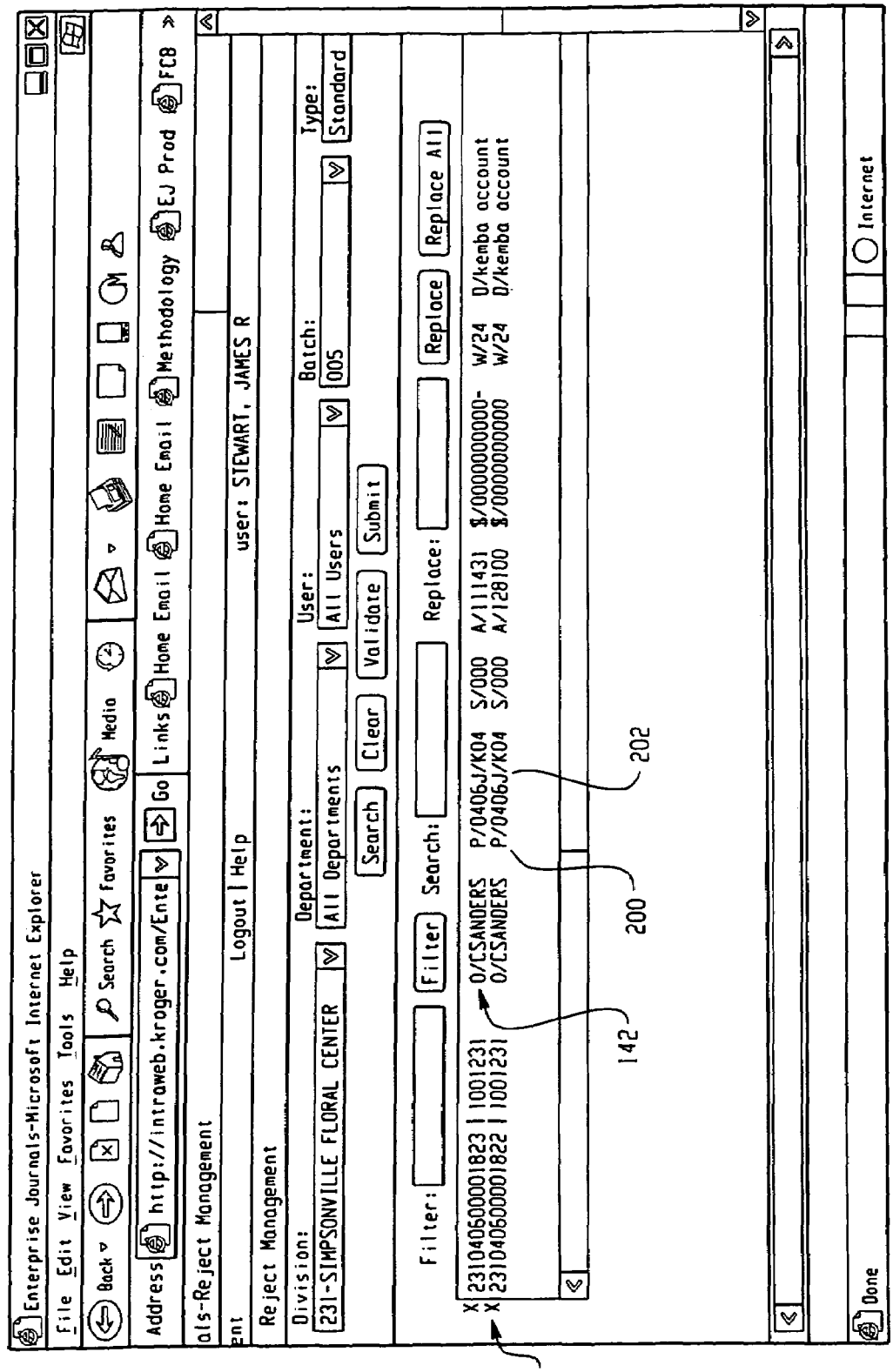
FIG. 20 is an exemplary reject management form.

FIG. 20 shows an example of a rejected journal entry 142 including an associated tracking code 144 and FIG. 20A shows a detail view of code 144 examples. Referring particularly to FIG. 20A, portion 147 of the tracking code 144 corresponds to a unique identifier assigned to the rejected entry by the interactive system 12 and is used by the interactive system to track the rejected entry. Portion 149 of the tracking code 144 corresponds to the entry type (i.e., standard entry, standard history update, factor entry, factor history update, budget entry, budget history update or budget factor entry). Portion 151 of the tracking code 144 identifies the division number.

Referring back to FIG. 20, characters 200, identify an entry field in which the corresponding value 202 was entered during entry. For example, "P/" identifies the four character year and period using the format YYPP, "S/" identifies the store number, "A/" identifies the account number, "$/" identifies the dollar amount of the entry, "W/" identifies the fiscal week of the year of the entry, etc. The interactive system 12 can display an error code and/or description associated with the entry in response to the user's command, for example, when the user places the cursor on the "x" adjacent section 147 (see also FIG. 20A). Table II, below, sets forth some exemplary errors including error code examples, error descriptions and meanings, other examples are possible and the table should not be construed as limiting.

TABLE II

| Error Code | Error Description | Meaning |
| --- | --- | --- |
| 001 | Invalid Card Code | Card code other than those accepted found |
| 010 | Duplicate Field Identifier | Same identifier sent multiple times and rejected |
| 011 | Invalid Field Identifier | Field identifier found was not valid |
| 020 | Missing Amount Field | No dollar amount |
| 030 | Missing Book Date | P/YYPP missing from record |
| 040 | Missing Store Number | S/ or B/ missing from record |
| 050 | Missing Journal Entry Number | J/, R/, K/ or C/ field missing |
| 060 | Missing Owner Field | O/ field is missing |
| 070 | Missing Description Field | D/ field is missing |
| 080 | Missing Week Field | W/ field is missing |

Once error is corrected, the rejected entries can be validated based on the predetermined business rules stored in the interactive system. If the entry is validated, it can then be transmitted to the batch system 14 as described above.

Referring briefly to FIG. 1, as shown in dotted lines, systems 145 may, in some cases, communicate with the batch system 14, bypassing the interactive system 12. This can result in discrepancies between the predetermined rules stored in the interactive system 12 and the predetermined rules stored in the batch system 14 when the systems 145 modify or otherwise update the batch system's rules. Referring again to FIG. 19, journal entry rejections during batch processing may result from these discrepancies even though the same journal entries were previously approved in the interactive system 12. For use in updating rules (including charts or tables utilized by the interactive system's logic to validate or reject entries) stored in the memory of the interactive system 12, the system 10 can include a device, such as a data propagator, capable of listening for batch system 14 changes relating to reject rules and replicating the changes over to the interactive system, updating the rules stored in the memory of the interactive system 12. The updated rules stored in the interactive system 12 can then be used to correct the journal entries replicated from the batch system 14.

IV. Batch Processing of Valid Journal Entries and Account Reconciliation

Referring again to FIG. 19, valid journal entries (i.e., journal entries not rejected by the batch system 14) are processed by the batch system 14, applied to the general ledger 140 and resulting data stored to an input archive 148. Data stored to the input archive 148 is made available to the interactive system 12, e.g., for account reconciliation 146 by replicating 134 the data (e.g., automatically and/or upon request) from the input archive to the interactive system 12 in a format that can be processed by the interactive system.

Figure 21:
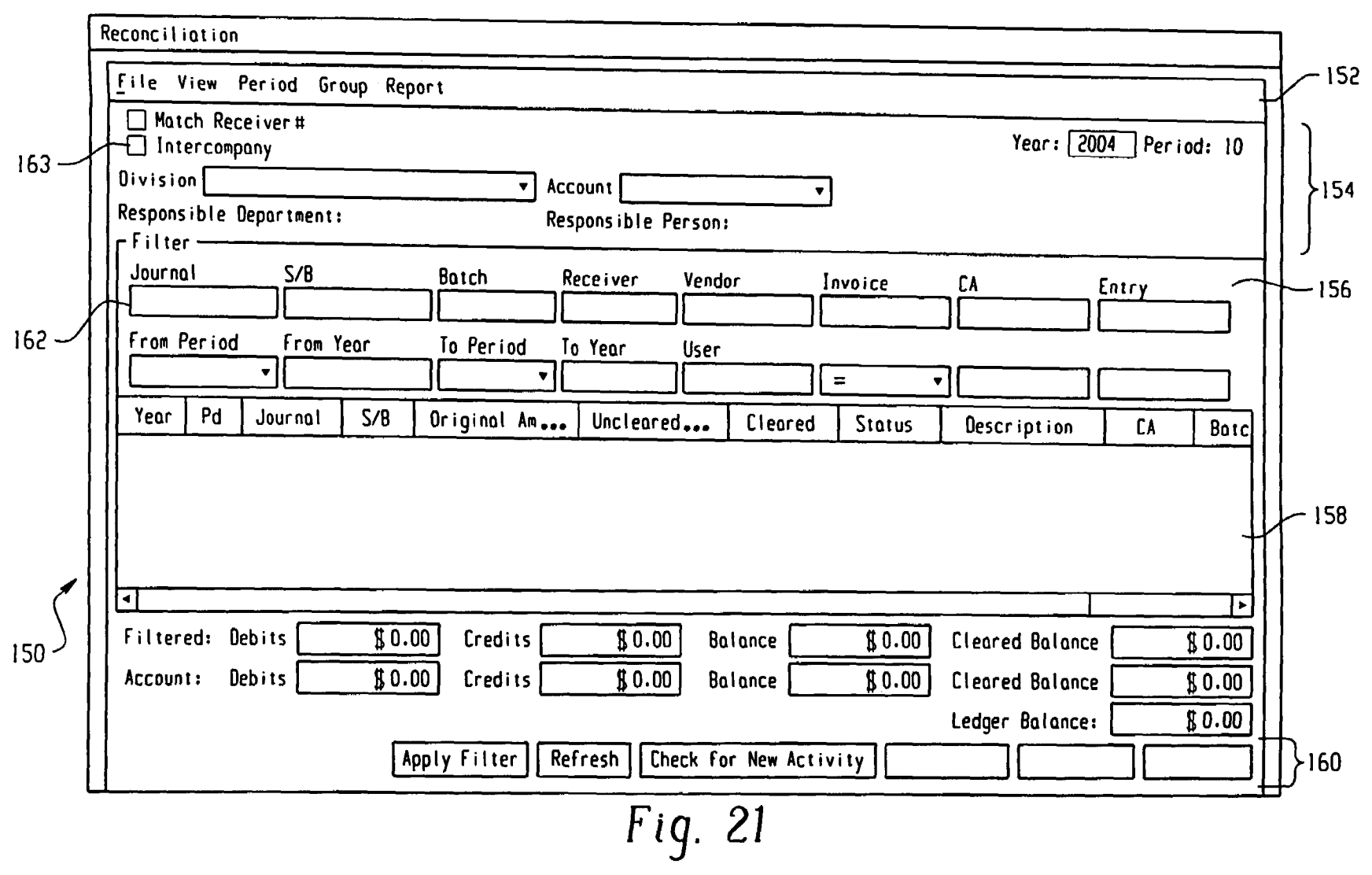

The accounting application 15 of interactive system 12 allows the user to take detail accounting entries replicated from the batch system 14 to the interactive system 12 and perform various accounting operations such as matching credits and debits into groups that balance to zero and move the zeroed groups to a history. FIG. 21 shows an example of an electronic reconciliation form 150. The reconciliation form 150 includes a menu bar 152, a division/account options section 154, an account detail filter 156, an account detail table 158 and an action button section 160. In the illustrated embodiment, accounts can be viewed by selecting (or setting) a period or by selecting a balancing group for a division and account, e.g., using the menu bar 152. The account detail filter 156 provides filtering of the detail entries displayed in the account detail table 158, once the data is retrieved from the batch system 14, by entering filtering criteria, such as amount, user, journal number, etc., in fields 162 of the account detail filter. The reconciliation form 150 also allows for balancing and viewing of intercompany accounts (e.g., across multiple divisions) by selecting intercompany feature 163.

Figure 22:
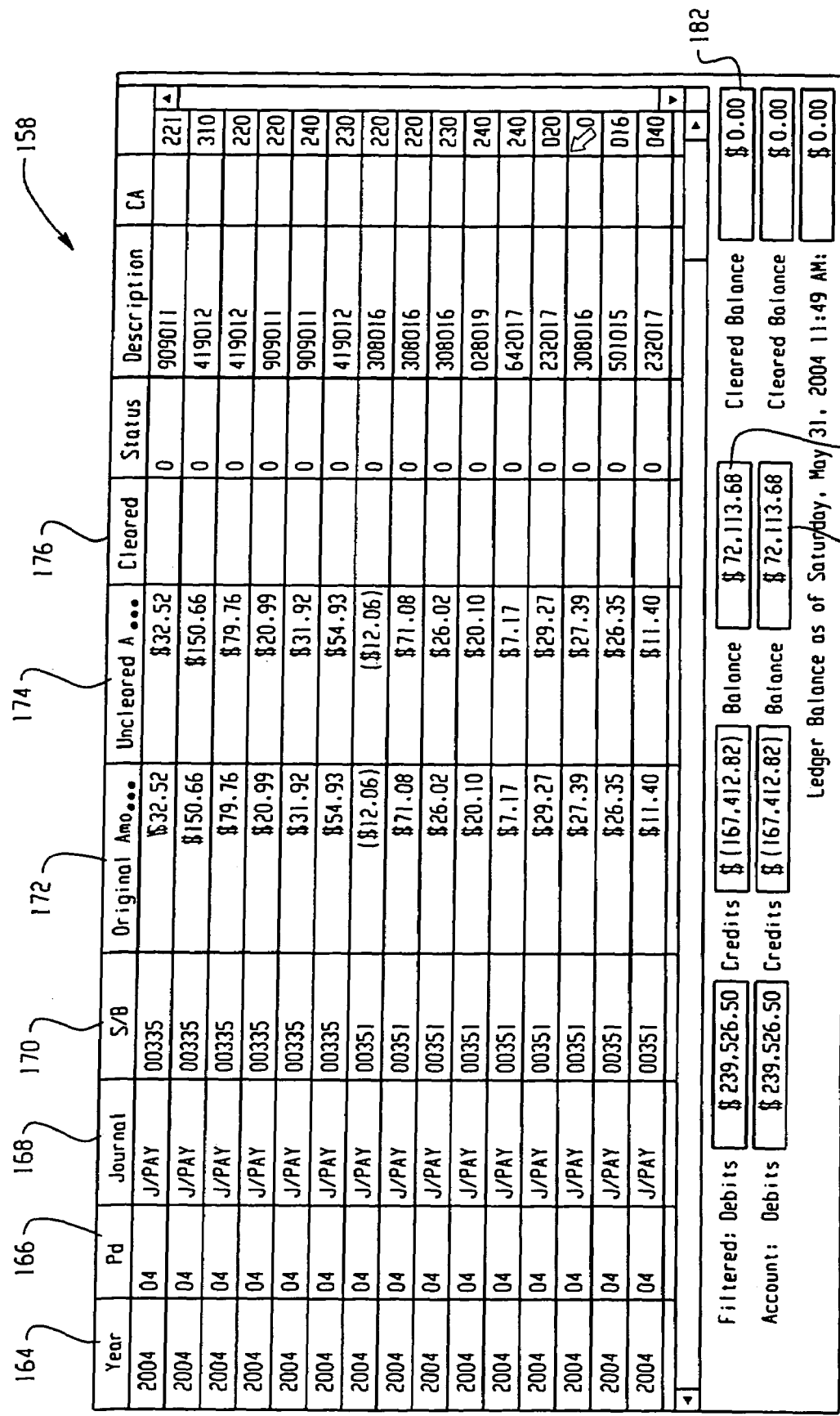
FIG. 22 is an exemplary detail entry table for use in the reconciliation form of FIG. 21.

FIG. 22 shows an embodiment of an account detail table 158 populated by records retrieved from the batch system 14. The account detail table 158 includes information associated with an entry including a year column 164 displaying the year of the account detail entry, a period column 166 displaying the period of the entry, a journal column 168 displaying the journal number of the entry, a store/buyer column 170 displaying the store or buyer of the entry, an original amount column 172 displaying the original amount of the entry, an uncleared amount column 174 displaying the uncleared amount of the entry, etc. The account detail table 158 also includes, among others, a cleared column 176 of cells that can be marked by a user and also displays respective sums of filtered 178, account 180 and cleared 182 (i.e., marked) balances. The respective sums are used when applying a filter and the totals are summed for records in the filter and placed in the filtered row. Debits are rows greater than zero and credits are rows less than zero, balance field includes all rows and cleared rows are rows marked cleared (C). The account row does not include the filter and does summaries for all records.

In order to move entries from the account detail table 158 to the journal history detail, e.g., in preparation for generating a balance detail report, the user creates balance groups, which are groups of detail entries that balance to an amount of zero. This can be accomplished by marking entries in the cleared column 176 and reviewing the cleared balance 182. When all the selected entries balance to zero, a balance group of the entries can be created using the action button section 160 (FIG. 21). The interactive system 12 can also allow the user to divide and/or combine entries to balance an account. In some embodiments, the interactive system 12 provides for automatic reconciliation by automatically marking accounts based on reconciliation rules stored in the interactive system 12.

V. Balance Sheet Reporting

Figure 23:
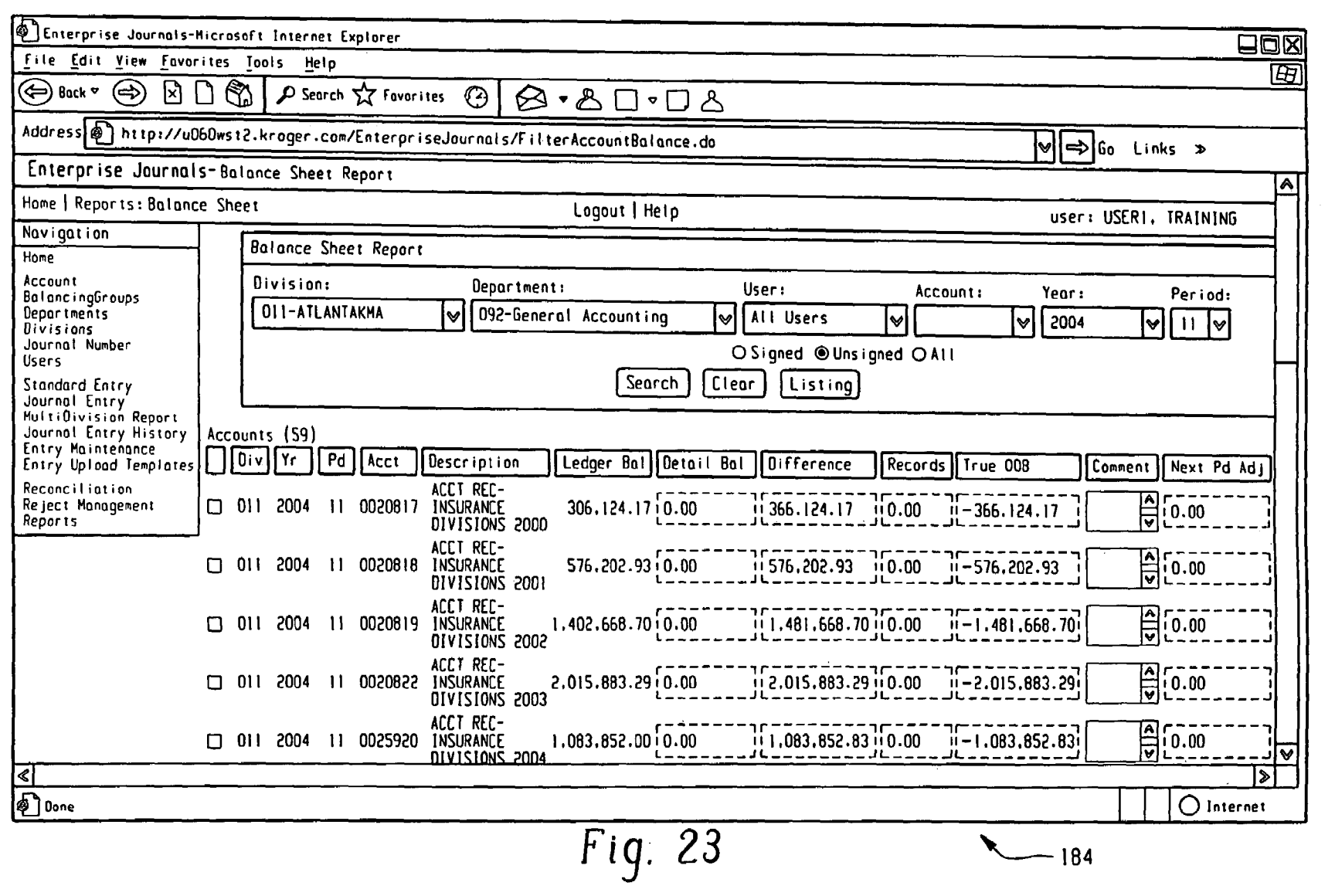

The balance sheet report allows users to review data, electronically sign or unsign the balance sheet and save data. Referring to FIG. 23, a balance detail report 184 can be generated for, e.g., a selected account, division and/or period. The ledger balance 185 is populated with the most recent "real time" figure. A user can insert their documented detail balance to support the ledger balance 185. An indicator, such as displaying the ledger balance 185 as red, can be used to indicate to a user that documentation may be needed to support the ledger balance.

Figure 24:
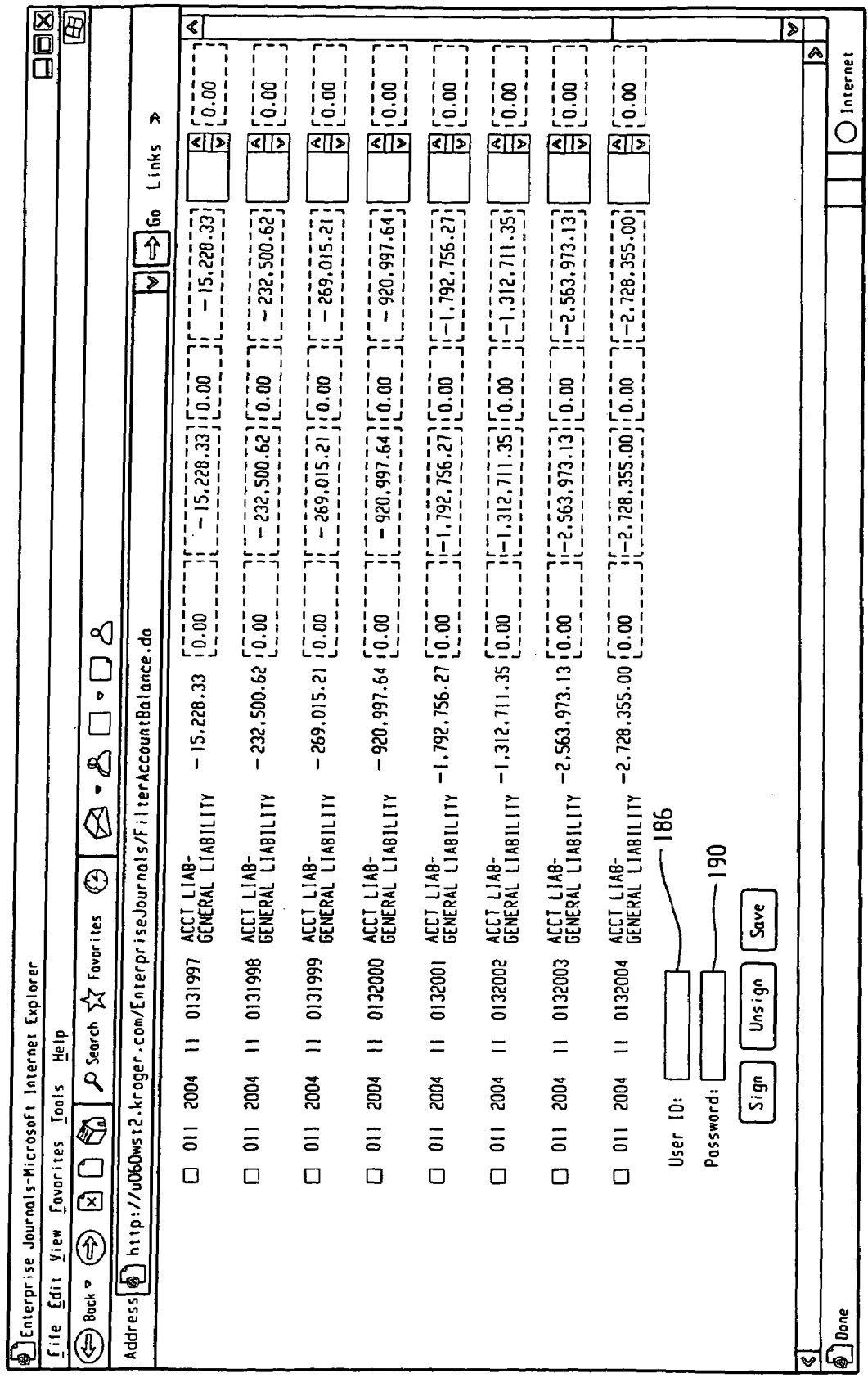
FIG. 24 shows the balance sheet report of FIG. 23 including electronic signature prompt.
Figure 25:
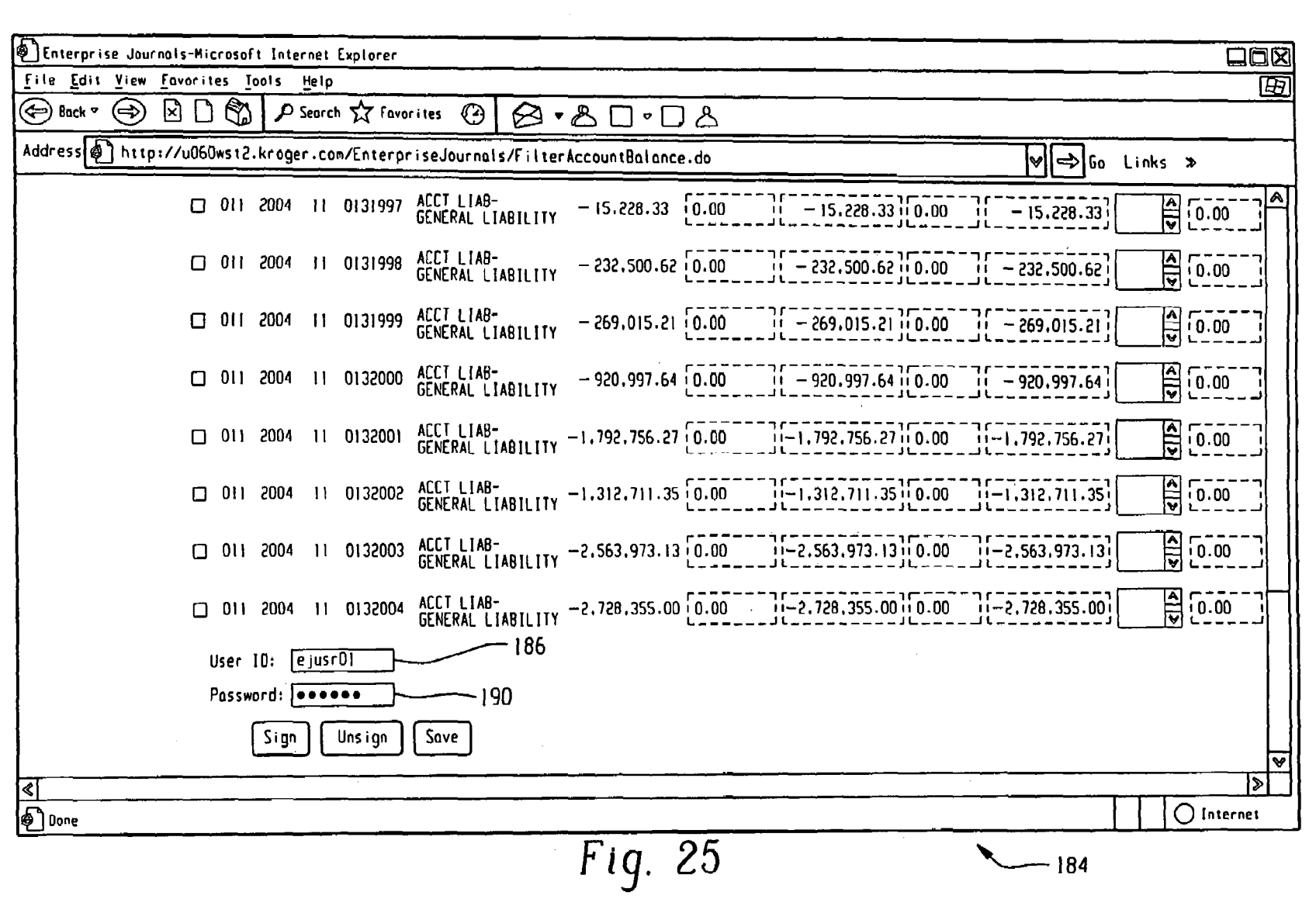

Referring to FIG. 24, the balance detail report 184 includes an electronic signature field 186 requiring an electronic signature that may include, for example, a user identification, such as a numeric or alphanumeric code and a time stamp and password field 190 requiring a user password. Referring to FIG. 25, the electronic signature associates a responsible user with the balance report. The balance detail report 184 may also include an approval field requiring approval by a supervisor. In some embodiments, balance sheets can have multiple approvers.

Figure 26:
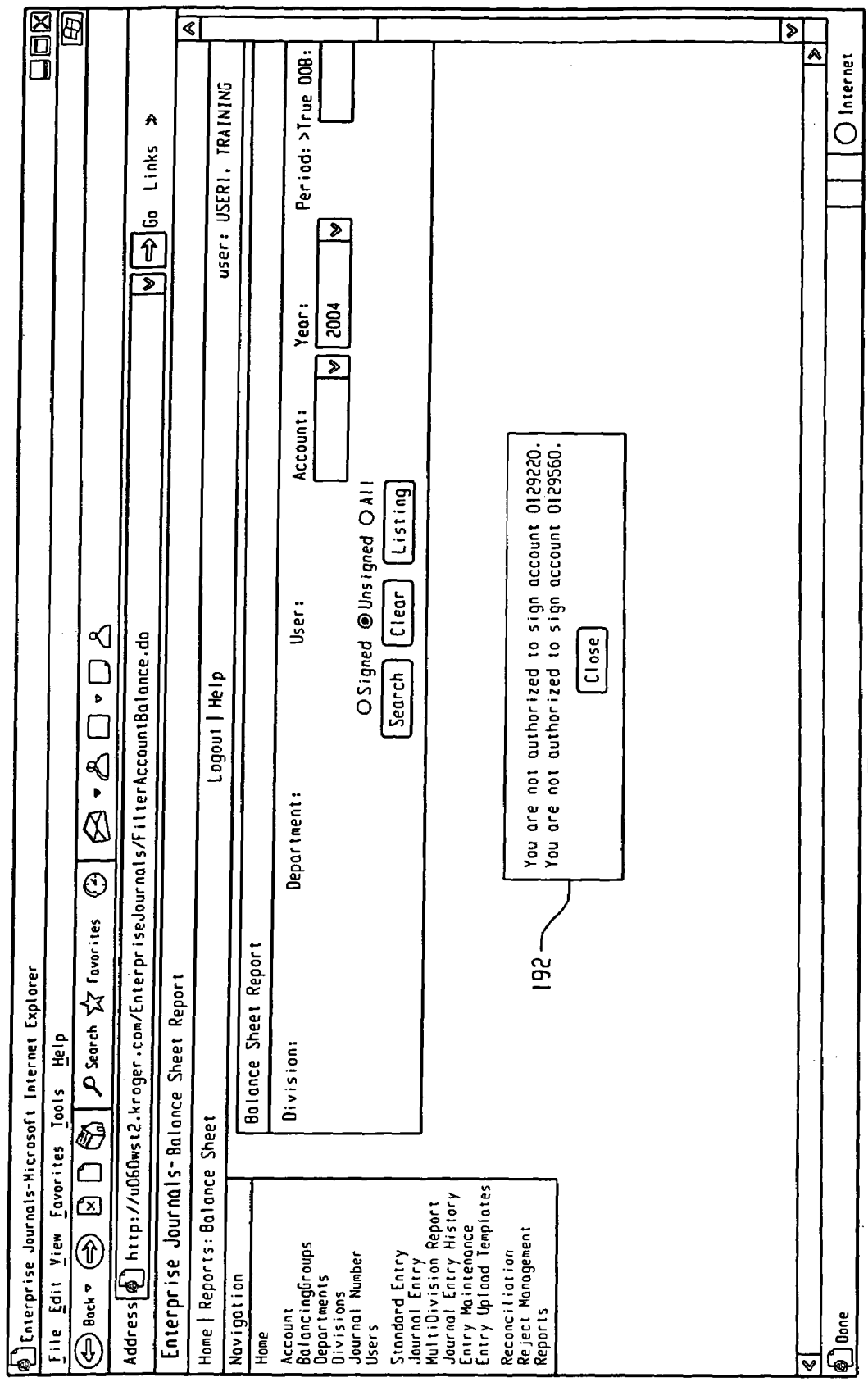
FIG. 26 shows an embodiment of an unauthorized signature message.
Figure 27:
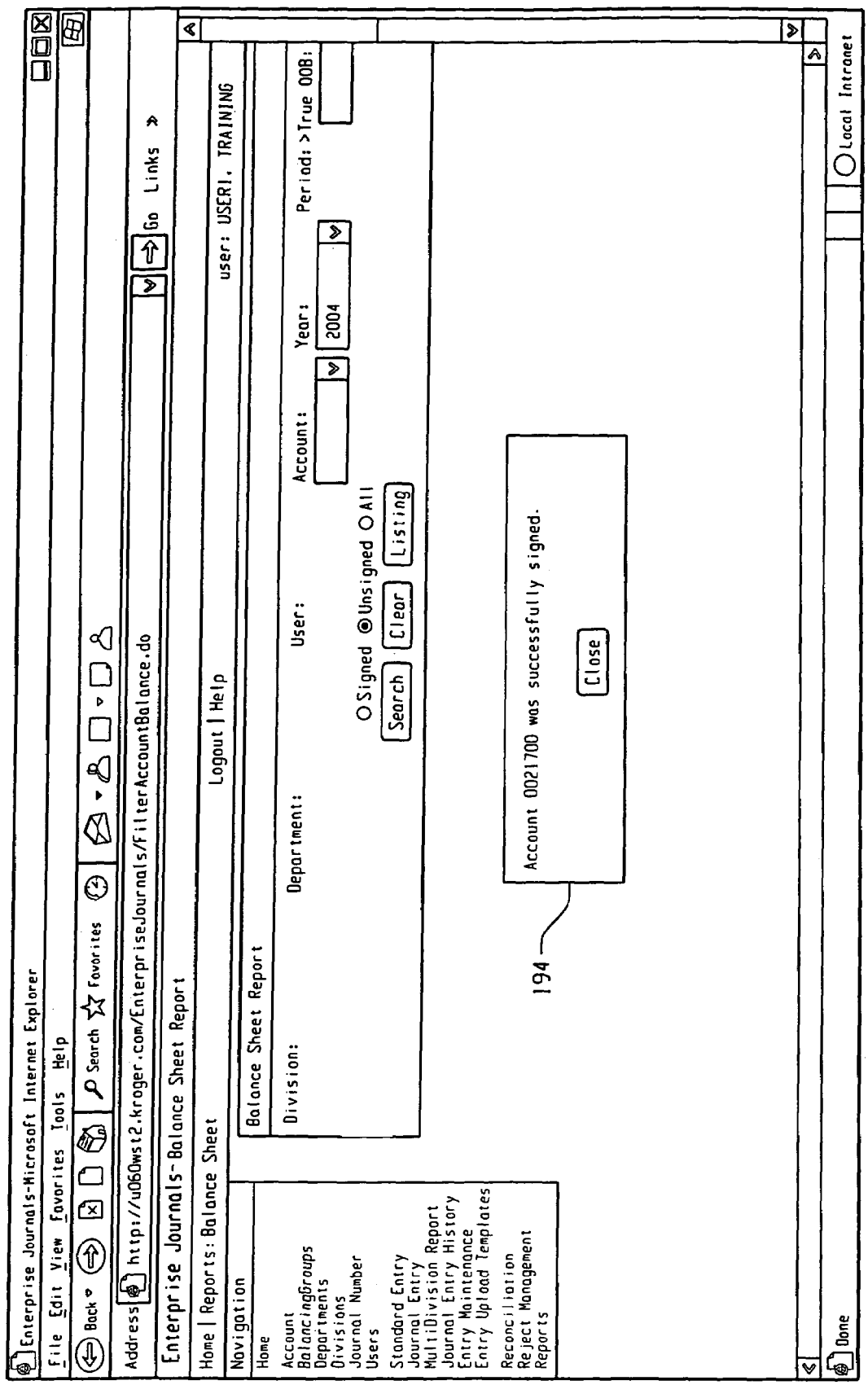
FIG. 27 shows an embodiment of an authorized signature message.
Figure 28:
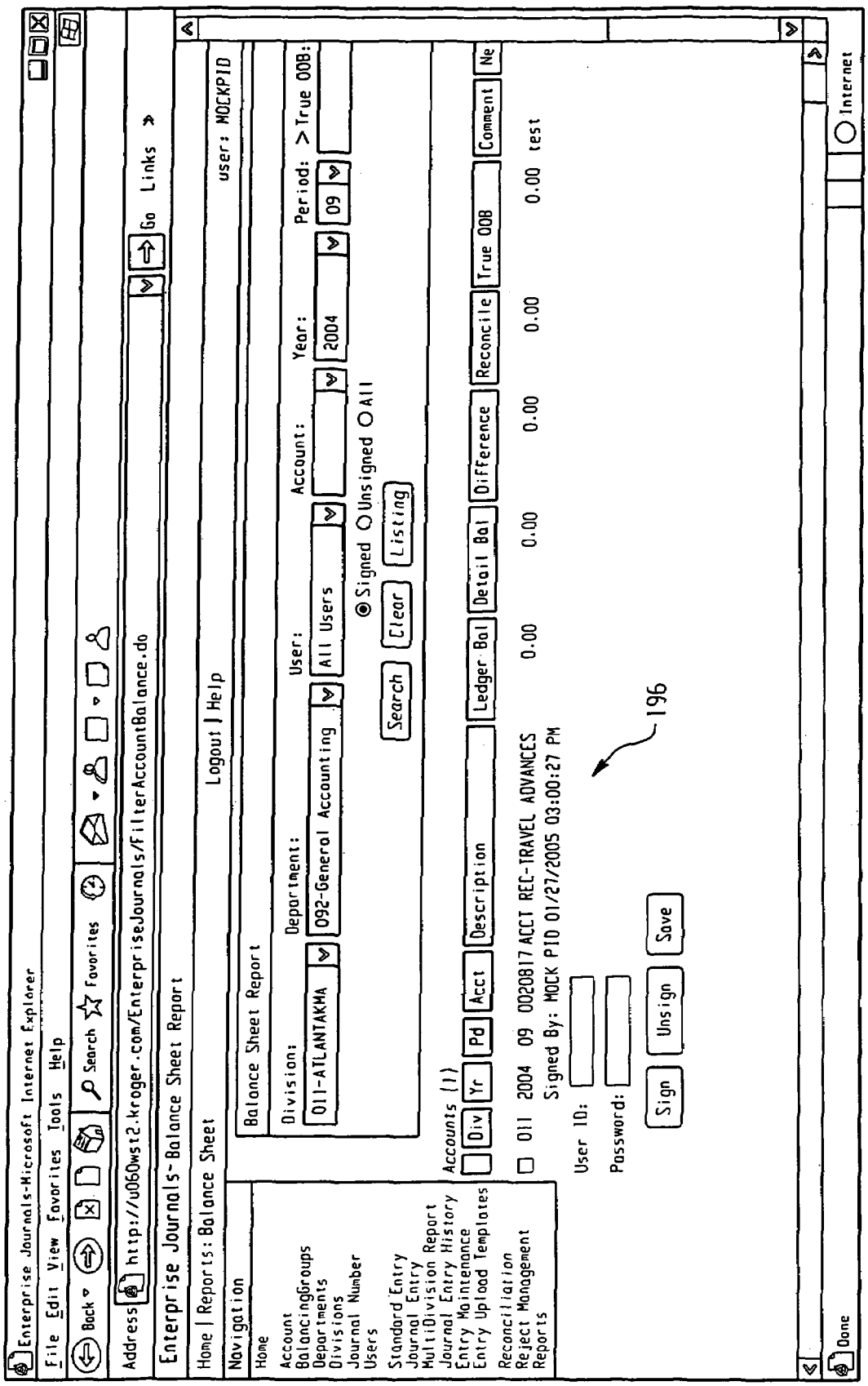
FIG. 28 shows an embodiment of a balanced entry

Referring to FIGS. 26 and 27, an authentication application can be used to authenticate the electronic signature. FIG. 26 shows an unauthorized signature message 192 while FIG. 27 shows an authorized signature message 194. Once the balance detail report 184 has been successfully authorized, it is listed as a signed entry 196, for example, as shown in FIG. 28. A history file may be kept for review of all balance sheet accounts and their respective balances.

A number of detailed embodiments have been described. Nevertheless, it will be understood that various modifications may be made. For example, an electronic signature may be required by the interactive system 12 during reconciliation of accounts. Accordingly, other embodiments are within the scope of the following claims.

What is claimed is:

1. A method for processing accounting data of an enterprise, the method comprising:
    entering accounting data entries associated with one or more accounts in memory of an interactive system, the interactive system capable of communicating with a batch system;
    the interactive system processing the accounting data entries for determining an accounting data entry error based on predetermined accounting rules stored in memory of the interactive system;
    copying at least some of the accounting data entries to the batch system, the batch system including a processor configured for rejecting certain ones of the accounting data entries copied to the batch system based on predetermined accounting rules stored in memory of the batch system and associating reject information with rejected accounting data entries for use in correcting the rejected accounting data entries;
    copying the rejected accounting data entries including the associated reject information to the interactive system; and
    displaying the accounting data entries rejected by the batch system including the reject information to a user at the interactive system, the reject information providing an indication to the user of why the accounting data entries were rejected; and
    updating the predetermined accounting rules stored in the memory of the interactive system based on the predetermined accounting rules stored in the memory of the batch system.

2. The method of claim 1 further comprising correcting the rejected accounting data entries using the interactive system.

3. The method of claim 2, wherein the step of correcting the rejected accounting data entries includes re-entering accounting data entries.

4. The method of claim 3 further comprising validating the accounting data entries re-entered using the interactive system.

5. The method of claim 1, wherein the step of the interactive system processing the accounting data entries for determining an accounting data entry error occurs prior to the step of copying at least some of the accounting data entries to the batch system.

6. The method of claim 1 further comprising associating an identifier with a rejected accounting data entry.

7. The method of claim 6, wherein the identifier comprises a field identifier.

8. The method of claim 1 further comprising validating or rejecting accounting data entries using the interactive system.

9. The method of claim 8, wherein only accounting data entries validated by the interactive system are copied to the batch system for processing.

10. The method of claim 9 wherein the processor of the batch system is configured for validating others of the accounting data entries copied to the batch system based on the predetermined accounting rules stored in the memory of the batch system.

11. The method of claim 1 further comprising generating a balance sheet using the interactive system, the balance sheet including accounting data entries stored in memory of the interactive system.

12. The method of claim 11 further comprising electronically signing the balance sheet with an electronic signature using the interactive system.

13. The method of claim 1 further comprising:
providing a rule update to the batch system from a system external to the batch system, the batch system automatically (i) storing the rule update in memory of the batch system and (ii) communicating the rule update to the interactive system;
the interactive system automatically storing the rule update in memory of the interactive system for use in future approval of accounting data entries.

14. The method of claim 1 further comprising the batch system applying approved accounting data entries to a general ledger of the batch system.

15. A method for processing accounting data of an enterprise, the method comprising:
entering accounting data entries associated with one or more accounts in memory of an interactive system, the interactive system capable of communicating with a batch system;
the interactive system processing the accounting data entries for approval based on predetermined rules stored in memory of the interactive system, the predetermined rules being accounting related rules and/or detail related rules;
copying at least some approved accounting data entries from the interactive system to the batch system;
the batch system approving or rejecting the approved accounting data entries copied to the batch system based on predetermined rules stored in memory of the batch system, the predetermined rules being accounting related rules and/or detail related rules, the predetermined rules of the interactive system corresponding to the predetermined rules of the batch system;
the batch system associating reject information with approved accounting data entries that are rejected by the batch system, the reject information providing an indication for use in correcting the accounting data entries rejected by the batch system;
copying the accounting data entries rejected by the batch system including the associated reject information to the interactive system;
displaying the accounting data entries rejected by the batch system including the reject information to a user at the interactive system and receiving user corrections to the accounting data entries to produce corrected accounting data entries;
providing a rule update to the batch system from a system external to the batch system, the batch system automatically (i) storing the rule update in memory of the batch system and (ii) communicating the rule update to the interactive system; and
the interactive system automatically storing the rule update in memory of the interactive system for use in future approval of the accounting data entries.

16. The method of claim 15 further comprising:
the interactive system processing the corrected accounting data entries for approval based on the predetermined rules stored in memory of the interactive system;
copying at least some approved corrected accounting data entries from the interactive system to the batch system;
the batch system approving or rejecting the approved corrected accounting data entries copied to the batch system based on the predetermined rules stored in memory of the batch system;
the batch system applying approved corrected accounting data entries that pass the validation process to a general ledger of the batch system.

* * * * *

UNITED STATES PATENT AND TRADEMARK OFFICE
CERTIFICATE OF CORRECTION

PATENT NO. : 7,644,021 B2
APPLICATION NO. : 11/055549
DATED : January 5, 2010
INVENTOR(S) : Stewart, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1163 days.

Signed and Sealed this

Twenty-first Day of December, 2010

David J. Kappos
*Director of the United States Patent and Trademark Office*